US010409531B2

United States Patent
Minami

(10) Patent No.: US 10,409,531 B2
(45) Date of Patent: Sep. 10, 2019

(54) CONTROL DEVICE, NON-TRANSITORY RECORDING MEDIUM AND IMAGE FORMING SYSTEM

(71) Applicant: Konica Minolta, Inc., Chiyoda-ku, Tokyo (JP)

(72) Inventor: Keita Minami, Amagasaki (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 15/440,352

(22) Filed: Feb. 23, 2017

(65) Prior Publication Data

US 2017/0242636 A1 Aug. 24, 2017

(30) Foreign Application Priority Data

Feb. 23, 2016 (JP) ................................. 2016-031749

(51) Int. Cl.
*G06F 3/12* (2006.01)

(52) U.S. Cl.
CPC ............ *G06F 3/1213* (2013.01); *G06F 3/126* (2013.01); *G06F 3/1217* (2013.01); *G06F 3/1229* (2013.01); *G06F 3/1261* (2013.01); *G06F 3/1263* (2013.01); *G06F 3/1267* (2013.01); *G06F 3/1273* (2013.01); *G06F 3/1288* (2013.01); *G06F 3/1293* (2013.01); *G06F 3/1296* (2013.01)

(58) Field of Classification Search
CPC .............................. G06F 3/1213; G06F 3/1217
See application file for complete search history.

(56) References Cited

U.S. PATENT DOCUMENTS 5,287,194 A * 2/1994 Lobiondo .......... G03G 15/5083
358/1.15
2004/0080779 A1* 4/2004 Kawamoto ........... G06F 3/1204
358/1.14

(Continued)

FOREIGN PATENT DOCUMENTS

JP 2010-79895 A 4/2010
JP 2013092996 A 5/2013

(Continued)

OTHER PUBLICATIONS

Office Action dated May 2, 2017, by the Japanese Patent Office in corresponding Japanese Patent Application No. 2016-031749 and an English Translation of the Office Action. (13 pages).

(Continued)

*Primary Examiner* — Ibrahim Siddo
(74) *Attorney, Agent, or Firm* — Buchanan Ingersoll & Rooney PC

(57) ABSTRACT

A control device that is communicable with a plurality of image forming apparatuses, comprises: an information obtaining part that obtains history information from the plurality of image forming apparatuses; a spool destination deciding part that decides two or more image forming apparatuses as spool destinations of an accepted job from the plurality of image forming apparatuses based on plural pieces of history information obtained by the information obtaining part; and a job transmitter that transmits a job to the two or more image forming apparatuses decided by the spool destination deciding part.

44 Claims, 18 Drawing Sheets

(56) References Cited

U.S. PATENT DOCUMENTS

| | | | | |
|---|---|---|---|---|
| 2008/0259399 A1* | 10/2008 | Wada | .................... | G06F 3/1204 |
| | | | | 358/1.15 |
| 2010/0073705 A1 | 3/2010 | Cain | | |
| 2010/0073712 A1 | 3/2010 | Cain | | |
| 2010/0188687 A1* | 7/2010 | Fukano | ................. | G06F 3/1204 |
| | | | | 358/1.15 |
| 2010/0309845 A1* | 12/2010 | Jeon | ..................... | H04W 72/04 |
| | | | | 370/328 |
| 2011/0299120 A1* | 12/2011 | Sekine | .................. | G06F 3/1221 |
| | | | | 358/1.15 |
| 2013/0107315 A1 | 5/2013 | Ozawa et al. | | |
| 2015/0156351 A1 | 6/2015 | Yamamoto | | |
| 2015/0193674 A1 | 7/2015 | Ishiguro | | |

FOREIGN PATENT DOCUMENTS

| | | |
|---|---|---|
| JP | 2013-235446 A | 11/2013 |
| JP | 2014-119795 | 6/2014 |
| JP | 2015-107555 A | 6/2015 |
| JP | 2015-128828 A | 7/2015 |
| JP | 2015-141608 A | 8/2015 |

OTHER PUBLICATIONS

Office Action dated Aug. 1, 2017, by the Japanese Patent Office in corresponding Japanese Patent Application No. 2016-031749, and an English Translation of the Office Action. (11 pages).

Decision of Refusal issued in corresponding Japanese Patent Application No. 2016-031749, dated Oct. 17, 2017, with English Translation (6 pages).

* cited by examiner

FIG. 7

APPARATUS INFORMATION 27

| FUNCTION INFORMATION | | STORAGE CAPACITY INFORMATION | | INSTALLATION PLACE INFORMATION |
|---|---|---|---|---|
| MONOCHROME PRINT | YES | WHOLE STORAGE CAPACITY | 250GB | 5TH FLOOR/ DEPARTMENT OF GENERAL AFFAIRS/ CORRIDOR SIDE |
| COLOR PRINT | YES | | | |
| SINGLE-SIDED PRINT | YES | | | |
| DOUBLE-SIDED PRINT | YES | RESIDUAL STORAGE CAPACITY | 10GB | |
| PUNCH | YES | | | |
| STAPLE | YES | | | |
| FOLDING | NO | | | |

HISTORY INFORMATION 26

| USER NAME | JOB ID | ACCUMULATION DATE | EXECUTION DATE |
|---|---|---|---|
| USER NAME A | 123456 | 20160131 09:18:24 | 20160131 09:19:54 |
| USER NAME B | 123457 | 20160131 09:32:51 | 20160131 10:14:19 |
| USER NAME C | 123461 | 20160131 10:08:22 | 20160131 10:14:31 |
| USER NAME A | 123465 | 20160131 11:01:14 | 20160131 11:01:55 |
| USER NAME C | 123474 | 20160131 11:47:08 | 20160131 11:55:35 |

| IMAGE FORMING APPARATUS | 5a | 5b | 5c | 5d | 5e | TOTAL NUMBER OF USE TIMES |
|---|---|---|---|---|---|---|
| USER NAME A | 40% | 30% | 20% | 5% | 5% | 245 TIMES |
| USER NAME B | 8% | 60% | 20% | 10% | 2% | 102 TIMES |
| USER NAME C | 40% | 30% | 15% | 14% | 1% | 161 TIMES |
| USER NAME D | 0% | 0% | 100% | 0% | 0% | 3 TIMES |

CONTROL DEVICE, NON-TRANSITORY RECORDING MEDIUM AND IMAGE FORMING SYSTEM

The present U.S. patent application claims a priority under the Paris Convention of Japanese patent application No. 2016-031749 filed on Feb. 23, 2016, the entirety of which is incorporated herein by references.

BACKGROUND OF THE INVENTION

Field of the Invention

The present invention relates to a control device, a non-transitory recording medium and an image forming system.

Description of the Background Art

Conventionally known image forming systems enable any image forming apparatus in a plurality of image forming apparatuses to perform printout in a manner that a user operates a client terminal to transmit a print job to a server and moves to that image forming apparatus with which the user desires to perform the printout so as to execute an authentication process. For example, a system described in Japanese Patent Application Laid-Open No. JP 2015-141608 A has a function such that after a print job is transmitted to a server, the server specifies an image forming apparatus which is frequently used by a user before execution of an authentication process for printout, and warms up the specified image forming apparatus in advance.

However, even if the user selects the warmed-up image forming apparatus and executes the authentication process in the conventional technique, when the image the authentication process. For this reason, even when the image forming apparatus is warmed up in advance, a constant time is required until the download of the print job is completed, and thus the print job cannot be immediately started.

Similarly, when the user does not select the warmed-up image forming apparatus and the image forming apparatus does not hold the print job, it takes a time to download the print job. As a result, it takes a time until the execution of the print job is started.

SUMMARY OF THE INVENTION

The present invention is devised in order to solve the above problem, and its object is to provide a control device, a non-transitory recording medium and an image forming system in which a waiting time of a user is reduced as much as possible by shortening the time until the execution of a print job is started.

First, the present invention is directed to a control device that is communicable with a plurality of image forming apparatuses.

To achieve at least one of the abovementioned objects, according to one aspect of the present invention, the control device comprises: an information obtaining part that obtains history information from the plurality of image forming apparatuses; a spool destination deciding part that decides two or more image forming apparatuses as spool destinations of an accepted job from the plurality of image forming apparatuses based on plural pieces of history information obtained by the information obtaining part; and a job transmitter that transmits a job to the two or more image forming apparatuses decided by the spool destination deciding part.

Second, the present invention is directed to a non-transitory recording medium in which a computer-readable program to be executed in a computer communicable with a plurality of image forming apparatuses is recorded.

To achieve at least one of the abovementioned objects, according to one aspect of the present invention, the program allows the computer to execute: a first step of obtaining history information from the plurality of image forming apparatuses, respectively; a second step of deciding two or more of the plurality of image forming apparatuses as job spool destinations of an accepted job based on the plural pieces of history information obtained at the first step; and a third step of transmitting the job to the two or more image forming apparatuses decided at the second step.

Third, the present invention is directed to an image forming system.

To achieve at least one of the abovementioned objects, according to one aspect of the present invention, the image processing system comprises: a plurality of image forming apparatuses; and a control device that transmits a job to a spool destination selected from the plurality of image forming apparatuses. Each of the plurality of image forming apparatuses includes: a storage part that stores a job when receiving the job from the control device; a job executing part that obtains the job from the storage part or another image forming apparatus so as to execute the job, and a history management part that records an execution history of the job on history information to manage the history information when the job executing part executes the job. The control device includes: an information obtaining part that obtains history information of the plurality of image forming apparatuses, a spool destination deciding part that decides two or more of the plurality of image forming apparatuses as spool destinations of an accepted job based on plural pieces of history information obtained by the information obtaining part, and a job transmitter that transmits a job to the two or more image forming apparatuses decided by the spool destination deciding part.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 7 is a diagram illustrating one example of apparatus information;

FIG. 8 is a diagram illustrating one example of history information;

FIG. 9 is a diagram illustrating use frequency of each user;

DESCRIPTION OF THE PRESENT PREFERRED EMBODIMENTS

Hereinafter, embodiments of the present invention will be described with reference to the drawings. However, the scope of the invention is not limited to the illustrated examples.

First Preferred Embodiment

Figure 1:
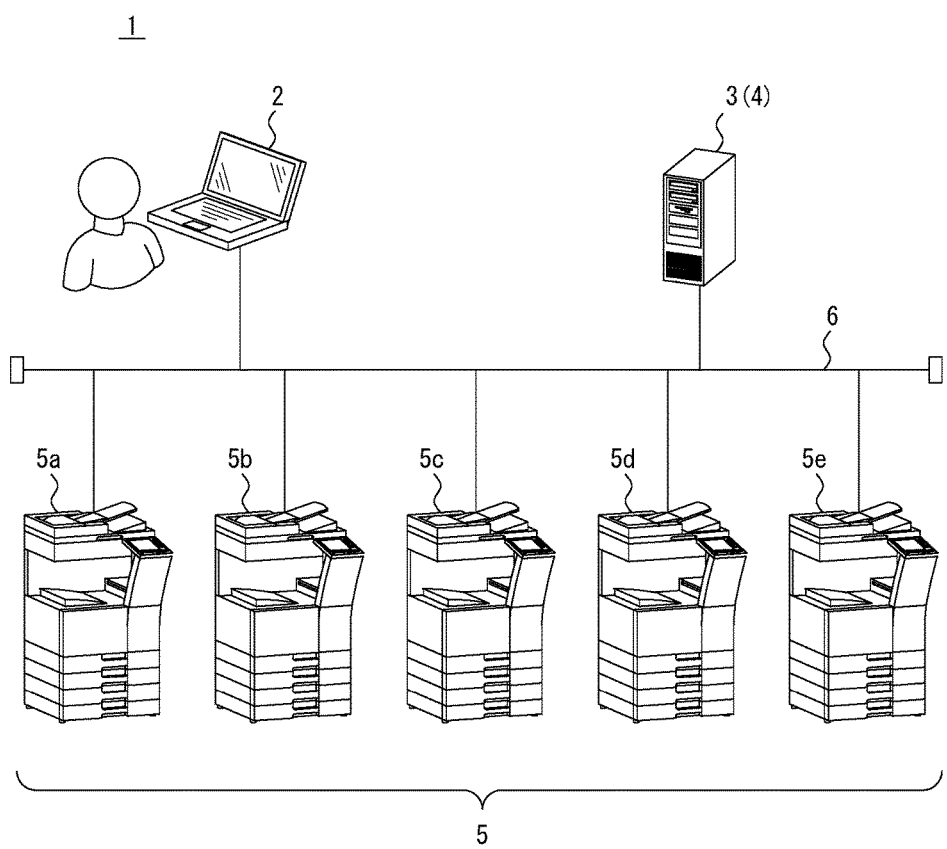
FIG. 1 is a diagram illustrating one configuration example of an image forming system.

FIG. 1 is a diagram illustrating one configuration example of an image forming system 1 of the present invention. The image forming system 1 is configured so that an information processing device 2, a print server 3, a plurality of image forming apparatuses 5a, 5b, 5c, 5d, and 5c, can communicate with each other via a network 6 such as LAN (Local Area Network). FIG. 1 illustrates a case where the five image forming apparatuses 5a, 5b, 5c, 5d, and 5e are connected to the network 6, but a number of the image forming apparatuses 5 is not limited to five. Further, a number of the information processing device 2 is not limited to one, and thus the plurality of information processing devices 2 may be connected to the network 6. In the following description, when the plurality of image forming apparatuses 5a, 5b, 5c, 5d, and 5e is not discriminated from each other, they are generally described as the image forming apparatus 5.

The image forming apparatus 5 is an apparatus configured by, for example, MFP (Multifunction Peripherals) and a printer, and executes a print job to perform printout. The image forming apparatus 5 has a function for temporarily spooling the print job to be received via the network 6. When the image forming apparatus 5 detects a print instruction to be given by a user during the spooling of the print job, the image forming apparatus 5 reads to execute the spooled print job. When the image forming apparatus 5 detects a print instruction with respect to the print job that is not spooled by itself but spooled by another image forming apparatus 5, the image forming apparatus 5 obtains the print job from another image forming apparatus 5 via the network 6 to execute the print job.

The information processing device 2 is configured by, for example, a personal computer (PC). A driver program is installed in the information processing device 2 in advance. When the information processing device 2 executes the driver program based on an instruction from the user, the information processing device 2 activates a print driver. The print driver generates a print job based on the print instruction from a user, and transmits the print job to a print server 3 via the network 6. At this time, the print job to be transmitted includes image data to be printed, setting information including various setting values for execution of jobs, and user information relating to a user who issues jobs.

The print server 3 functions as a print control device 4. When the print server 3 receives the print job via the network 6, the print server 3 decides a spool destination for the print job from the plurality of image forming apparatuses 5 based on information included in the print job. The print server 3 transmits the received print job to the image forming apparatus 5 decided as a spool destination. As a result, the print job issued by the information processing device 2 is spooled in the image forming apparatus 5 decided as the spool destination in the print server 3.

Figure 2:
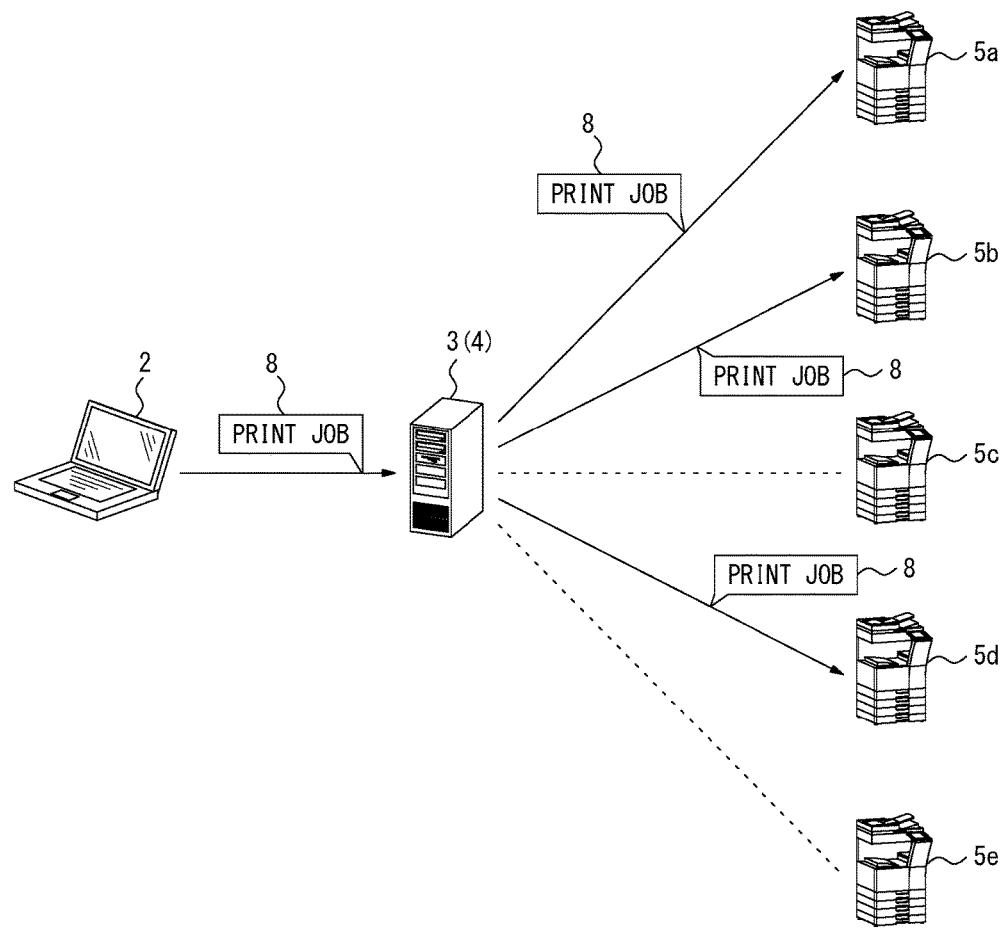
FIG. 2 is a diagram illustrating a transmission example of a print job in the image forming system.

FIG. 2 is a diagram illustrating a transmission example of the print job in the image forming system 1. When a print job 8 is transmitted from the information processing device 2 to the print server 3, the print server 3 decides two or more of the plurality of image forming apparatuses 5 as spool destinations based on the information included in that print job 8. At this time, the print server 3 decides two or more image forming apparatuses 5 that are likely to be used by the user as spool destinations. The print server 3 transmits the print job 8 to the two or more image forming apparatuses 5 decided as spool destinations. In the example of FIG. 2, the print job 8 is transmitted to the three image forming apparatuses 5a, 5b, and 5d. When the three image forming apparatuses 5a, 5b, and 5d receive the print job 8 from the print server 3, the three image forming apparatuses save to spool the print job 8.

Thereafter, the user moves to an installation place of one image forming apparatus 5 from which printout is desired to be performed, and logs in the image forming apparatus 5. As a result, the print job 8 in the spool state can be executed. At this time, when the image forming apparatus 5 in which the user has logged spools the print job 8, the image forming apparatus 5 does not have to obtain the print job 8 from another image forming apparatus 5 via the network 6. For this reason, the execution of the print job 8 is immediately started, and a waiting time of the user is shortened.

In this embodiment, when the print server 3 decides the spool destination of the print job 8, the print server 3 specifies two or more image forming apparatuses 5 which are likely to be used by the user, and the print job 8 is spooled in the two or more image forming apparatuses 5. For this reason, a likelihood such that the print job 8 is not spooled in the image forming apparatus 5 which the user logs in later can be reduced. For this reason, even when the user performs printout using any of the plurality of image forming apparatuses 5, the waiting time of the user until the execution of the print job 8 is started can be shortened as much as possible. Such an image forming system 1 is described in more detail below.

Figure 3:
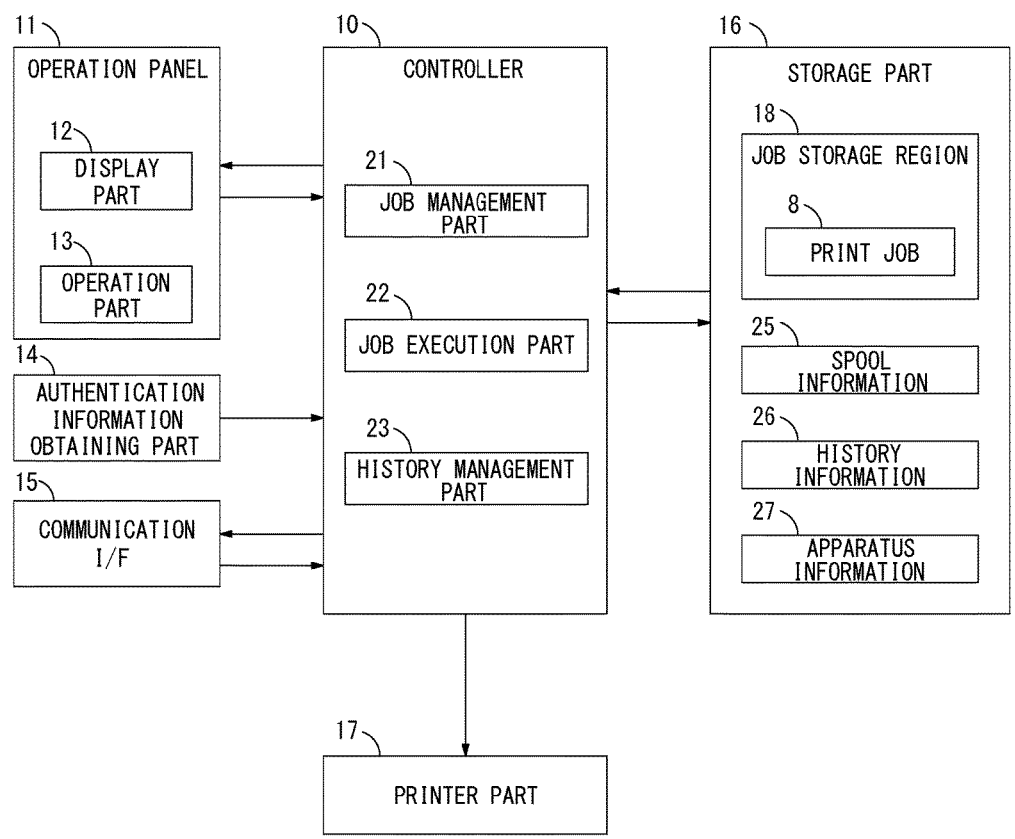
FIG. 3 is a block diagram illustrating one example of a hardware configuration and a function configuration of an image forming apparatus.

A configuration of the image forming apparatus 5 is first described. FIG. 3 is a block diagram illustrating one example of a hardware configuration and a function configuration of the image forming apparatus 5. The image forming apparatus 5 includes a controller 10, an operation panel 11, an authentication information obtaining part 14, a communication interface 15, a storage part 16, and a printer part 17.

The controller 10 has CPU, ROM, and RAM, not shown. When the CPU reads and executes a program stored in the ROM in advance, the controller 10 functions as a job management part 21, a job execution part 22, and a history management part 23.

The operation panel 11 becomes a user interface when the user uses the image forming apparatus 5. The operation panel 11 has a display part 12 that displays various information for the user, and an operation part 13 that accepts operations from the user. The display part 12 is configured by, for example, a color liquid crystal display. Further, the operation part 13 is configured by touch panel keys disposed on a display screen of the display part 12, and push button keys disposed around the display screen of the display part 12.

The authentication information obtaining part 14 is configured by, for example, a card reader that reads card information recorded in an IC card owned by the user as authentication information. The authentication information obtaining part 14 may be configured by a biometric information reading device that reads biometric information, such as a fingerprint pattern and a vein pattern of a user besides the card reader.

The communication interface 15 communicates with the print server 3, the information processing device 2, and another image forming apparatus 5 via the network 6.

The storage part 16 is a non-volatile storage part configured by, for example, a hard disc drive (HDD). The storage part 16 is provided with a job storage region 18 that saves the print job 8 to be transmitted from the print server 3. Further, the storage part 16 holds spool information 25, history information 26, and apparatus information 27. The print job 8 spooled in the job storage region 18 and another image forming apparatus 5 is registered in the spool information 25. When the print job 8 is executed in the image forming apparatus 5, a job execution history is recorded in the history information 26. Various information relating to the image forming apparatus 5 is recorded in the apparatus information 27.

The printer part 17 executes the print job to perform printout. For example, the printer part 17 forms an image on a sheet material such as a print sheet based on image data included in the print job 8 to be input from the controller 10 and performs printout.

The job management part 21 is a processor that manages the print job 8 recorded in the job storage region 18. When the job management part 21 receives the print job 8 transmitted from the print server 3 via the communication interface 15, the job management part 21 stores the print job 8 in the job storage region 18. As a result, the print job 8 is spooled in the image forming apparatus 5. When the job management part 21 stores the print job 8 in the job storage region 18, the job management part 21 writes information about the print job 8 in the spool information 25. That is to say, the job management part 21 writes the information about the print job 8, which is stored in the job storage region 18, in the spool information 25 so as to manage the print job 8.

Further, the job management part 21 periodically communicates with another image forming apparatus 5, and obtains information about the print job 8 spooled in another image forming apparatus 5. The job management part 21 writes also the information about the print job 8, which is spooled in another image forming apparatus 5, in the spool information 25 so as to manage also the print job 8 spooled in another image forming apparatus 5.

When the authentication information obtaining part 14 obtains authentication information of the user who tries to use the image forming apparatus 5, the job management part 21 executes an authentication process for authenticating the user based on the authentication information. In the authentication process, for example, the job management part 21 transmits an authentication request with the authentication information to an authentication server, not shown, and receives an authentication result from the authentication server. When the job management part 21 succeeds in the authentication of the user so as to be capable of specifying the user in the authentication process, the job management part 21 allows the user as a log-in user to log in the image forming apparatus 5. The job management part 21 extracts the information about the print jobs 8 issued by the log-in user from the print jobs 8 stored in the spool information 25, and displays a list of the extracted print jobs 8 on the display part 12. As a result, the user selects the print job 8 which is a target for printout from the list displayed on the display part 12 and can give an execution instruction to the image forming apparatus 5.

When the log-in user selects the print job 8 to give a job executing instruction, the job execution part 22 functions. The job execution part 22 obtains the print job 8 specified by the log-in user, and outputs the print job 8 to the printer part 17. As a result, the print job 8 specified by the log-in user is executed, and the printer part 17 performs printout.

When the print job 8 specified by the log-in user is stored in the job storage region 18 of the image forming apparatus 5 in which the user has logged, the job execution part 22 reads the print job 8 from the job storage region 18 and outputs the print job 8 to the printer part 17. In this case, the job execution part 22 can obtain the print job 8 for a short time, and immediately starts printout.

Further, when the print job 8 specified by the log-in user is spooled in another image forming apparatus 5, the job execution part 22 communicates with the another image forming apparatus 5 via the network 6 to obtain the print job 8 from the another image forming apparatus 5. In this case, it takes a long time for the job execution part 22 to obtain the print job 8, and when a heavy load is placed on the network 6, the time becomes longer.

When the job execution part 22 executes the print job 8, the history management part 23 records an execution history of the print job 8 in the history information 26. The history management part 23 relates the job execution history to the information about the log-in user to record the related information in the history information 26. Further, the history management part 23 is configured so as to manage not only the history information 26 but also the apparatus information 27. When receiving a request for transmission of the history information 26 and the apparatus information 27 from the print server 3, the history management part 23 reads the history information 26 and the apparatus information 27 from the storage part 16, and transmits the information to the print server 3.

Figure 4:
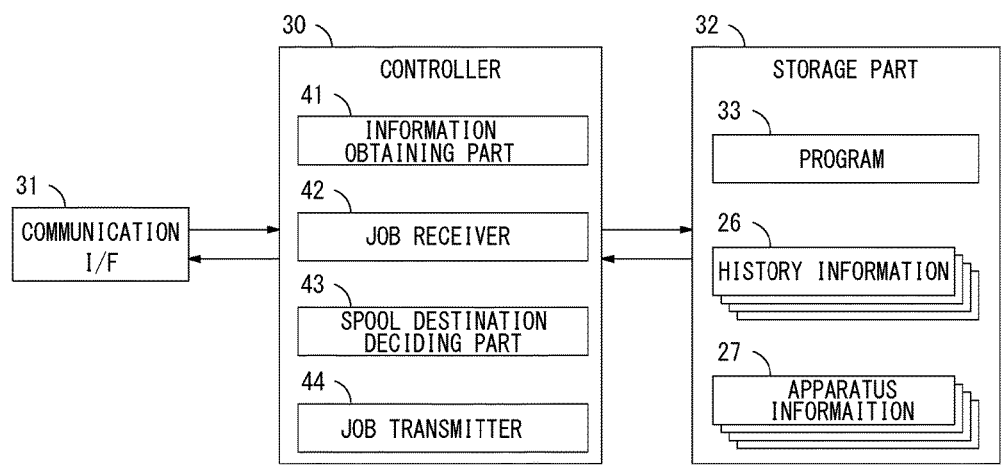
FIG. 4 is a block diagram illustrating one example of a hardware configuration and a function configuration of a print server.

A configuration of the print server 3 is described below. FIG. 4 is a block diagram illustrating one example of a hardware configuration and a function configuration of the print server 3. The print server 3 includes a controller 30, a communication interface 31, and a storage part 32.

The controller 30 has CPU and a memory, not shown. When the CPU reads and executes a program 33 stored in the storage part 32 in advance, the controller 30 functions as an information obtaining part 41, a job receiver 42, and a spool destination deciding part 43, and a job transmitter 44.

The communication interface 31 communicates with the information processing device 2 and the plurality of image forming apparatuses 5 via the network 6.

The storage part 32 is a non-volatile storage part configured by, for example, a hard disc drive (HDD). The storage part 32 holds the history information 26 and the apparatus information 27 collected from the plurality of image forming apparatuses 5 besides the program 33 to be executed by the CPU of the controller 30.

The information obtaining part 41 is a processor that obtains the history information 26 and the apparatus information 27 held in the plurality of image forming apparatuses 5 at a predetermined timing, and stores the information in the storage part 32. For example, the information obtaining part 41 again obtains the history information 26 and the apparatus information 27 from the plurality of image forming apparatuses 5 every time when a predetermined time elapses after the previous obtaining timing of the history information 26 and the apparatus information 27, so as to update the history information 26 and the apparatus information 27 stored in the storage part 32 into latest information.

The job receiver 42 functions when receiving the print job 8 transmitted from the information processing device 2, and accepts the print job 8 as a job to be spooled.

The spool destination deciding part 43 is a processor that decides a spool destination of the print job 8 accepted by the job receiver 42. The spool destination deciding part 43 reads plural pieces of history information 26 from the storage part 32, and decides two or more image forming apparatuses 5 which are likely to be used by the user who has issued the print job 8 as spool destinations based on the plural pieces of history information 26. For example, the spool destination deciding part 43 calculates a use frequency of each image forming apparatus 5 used by the user who has issued the print job 8 based on the plural pieces of history information 26, and decides at least two image forming apparatuses 5 as spool destinations taking the use frequency into consideration.

However, when the plurality of image forming apparatuses 5 includes the image forming apparatus 5 that cannot execute the print job 8 received from the information processing device 2, the spool destination deciding part 43 does not have to decide the image forming apparatus 5 that cannot execute the print job 8 as a spool destination. For example, when the print job 8 received from the information processing device 2 is a job for color print and the plurality of image forming apparatuses 5 includes the image forming apparatus 5 that is exclusive for monochrome output and cannot perform color print, the spool destination deciding part 43 does not have to decide the image forming apparatus 5 exclusive for monochrome output as a spool destination. This is because after the print job 8 for performing color print is transmitted, the user does not log in the image forming apparatus 5 exclusive for monochrome output and does not instruct print, but logs in the image forming apparatus 5 that can perform color print and instructs print.

For this reason, the spool destination deciding part 43 reads the plural pieces of apparatus information 27, which is obtained from the plurality of image forming apparatuses 5, respectively, from the storage part 32, and collates the plural pieces of apparatus information 27 with the setting information included in the print job 8. As a result, the spool destination deciding part 43 extracts all the image forming apparatuses 5 that can execute the print job 8 to select these image forming apparatuses 5 as spool destination candidates. That is to say, the spool destination deciding part 43 excludes the image forming apparatuses 5 that cannot execute the print job 8 in advance from subjects to be decided as spool destinations. When the spool destination deciding part 43 decides the two or more image forming apparatuses 5 as spool destinations based on the plural pieces of history information 26, the spool destination deciding part 43 decides a spool destination preferentially from the image forming apparatuses 5 selected as the spool destination candidates.

Further, the spool destination deciding part 43 determines whether the image forming apparatus 5 decided as the spool destination has a residual storage capacity sufficient for storing the print job. When the image forming apparatus 5 does not have a sufficient residual storage capacity, the spool destination deciding part 43 transmits a transfer command, for transferring an old print job 8 to another image forming apparatus 5, to the image forming apparatus 5. As a result, before receiving the print job 8, the image forming apparatus 5 decided as the spool destination transmits the old print job 8 to another image forming apparatus 5 based on the transfer command so as to secure a sufficient residual storage capacity.

The job transmitter 44 functions as the spool destination deciding part 43 decides the two or more image forming apparatuses 5 as spool destinations. The job transmitter 44 transmits the print job 8 accepted by the job receiver 42 to each of the two or more image forming apparatuses 5 decided as spool destinations.

Figure 5:
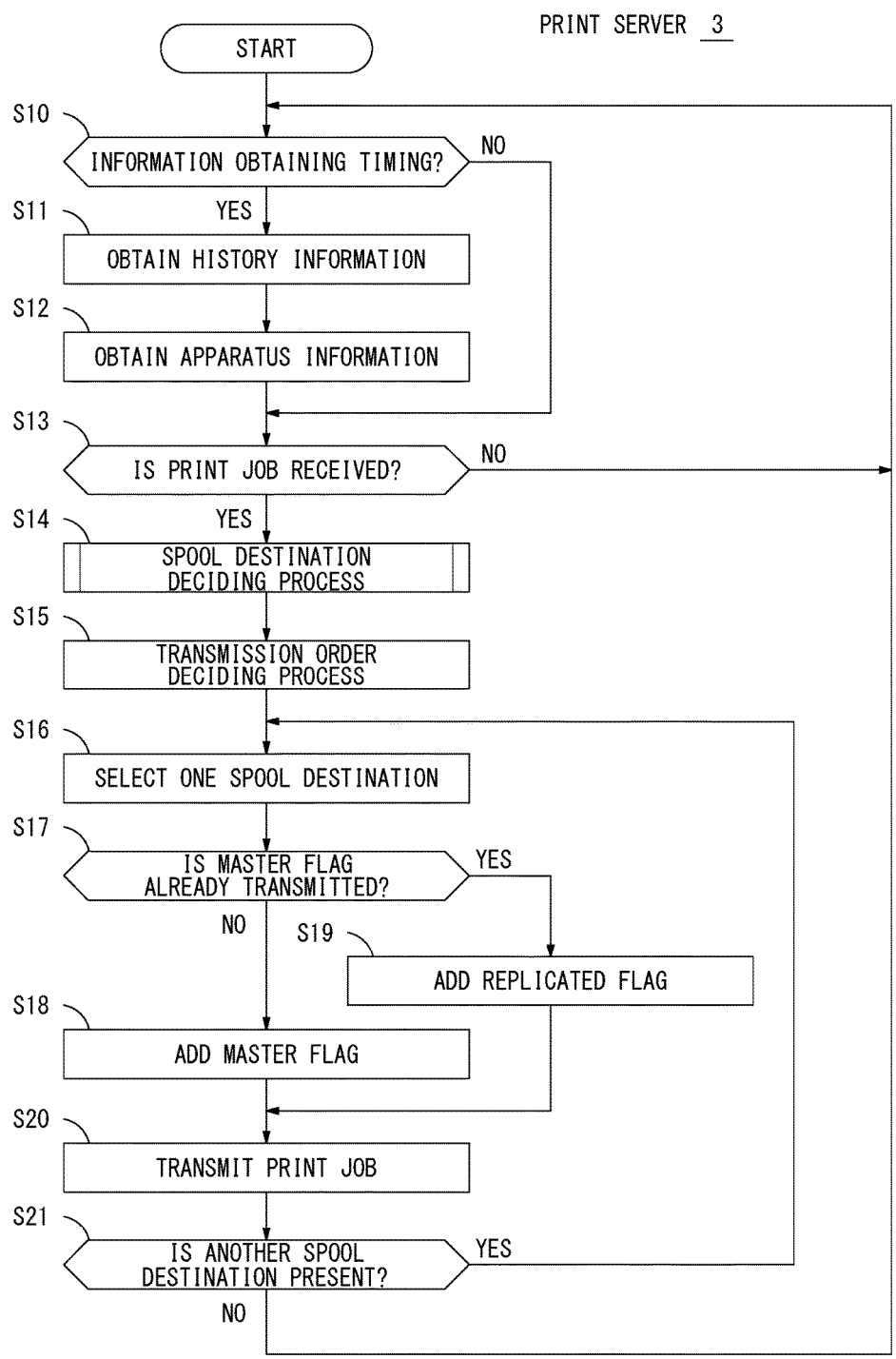
FIG. 5 is a flowchart illustrating one example of a main processing procedure to be executed in the print server.

FIG. 5 is a flowchart illustrating one example of a processing procedure to be executed in the print server 3. This process is executed in a manner that the CPU of the controller 30 executes the program 33. When the print server 3 starts this process, the print server 3 first determines whether timing to obtain the history information 26 and the apparatus information 27 from the plurality of image forming apparatuses 5 comes (step S10). As a result, when the timing to obtain the history information 26 and the apparatus information 27 comes (YES at step S10), the print server 3 performs multi-destination transmission on a request for transmission of information to the plurality of image forming apparatuses 5, and obtains the history information 26 and the apparatus information 27 from the plurality of image forming apparatuses 5 (steps S11 and S12). The print server 3 saves the history information 26 and the apparatus information 27 obtained from the plurality of image forming apparatuses 5 in the storage part 32. When the timing to obtain the history information 26 and the apparatus information 27 does not come (NO at step S10), the print server 3 skips the process at steps S11 and S12.

Thereafter, the print server 3 determines whether the print job 8 is received (step S13). At this time, when the print server 3 does not receive the print job 8 (NO at step S13), the print server 3 returns to step S10 so as to repeat the above process. On the contrary, when the print server 3 receives the print job 8 (YES at step S13), the print server 3 executes a spool destination deciding process (step S14).

Figure 6:
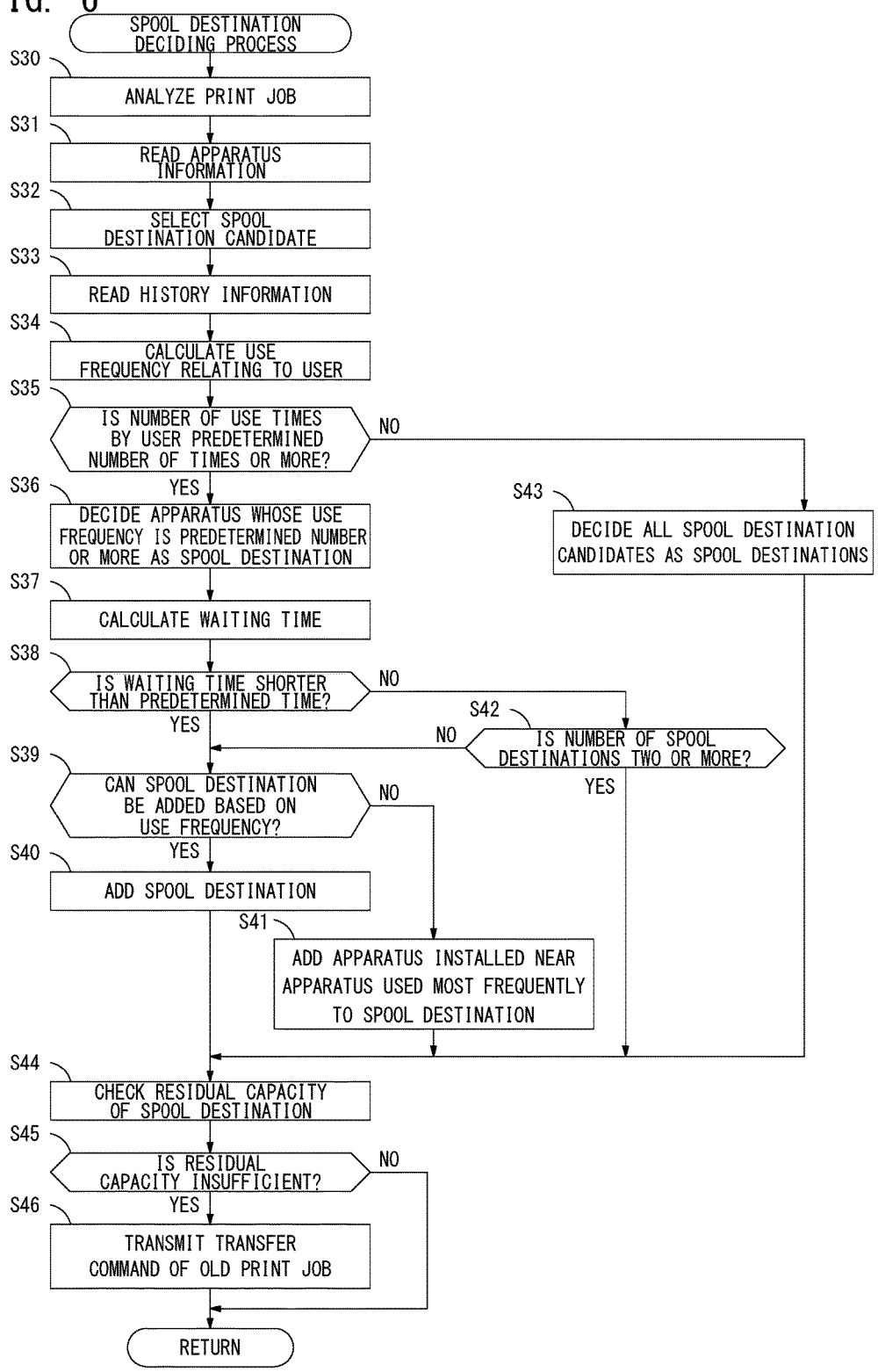
FIG. 6 is a flowchart illustrating one example of a detailed processing procedure of a spool destination deciding process.

FIG. 6 is a flowchart illustrating one example of a detailed processing procedure of the spool destination deciding process (step S14). This process is executed by the spool destination deciding part 43 of the print server 3. When the print server 3 starts the spool destination deciding process, the print server 3 first analyzes the received the print job 8 (step S30). The print server 3 reads the plural pieces of apparatus information 27 from the storage part 32 (step S31), and selects the image forming apparatuses 5 that can execute the print job 8 from the plurality of image forming apparatuses 5 as spool destination candidates (step S32).

FIG. 7 is a diagram illustrating one example of the apparatus information 27. The apparatus information 27 illustrated in FIG. 7 is information obtained from one image forming apparatus 5 in the plurality of image forming apparatuses 5. As illustrated in FIG. 7, the apparatus information 27 includes function information 27a, storage capacity information 27b, and installation place information 27c. The function information 27a is information about functions mounted to each image forming apparatus 5, and "YES" is provided to mounted functions and "NO" is provided to unmounted functions. Therefore, for example, when color print can be performed, "YES" is put into an item of color pint. Further, the storage capacity information 27b represents an entire storage capacity and a residual storage capacity of the storage part 16 of each image forming apparatus 5. When user sees the storage capacity information 27b, the user can understand how much the print job 8 is spooled in each image forming apparatus 5. Further, the installation place information 27c can specify each place where each image forming apparatus 5 is installed. When the user sees the installation place information 27c, the user can understand a relative position correlation between each image forming apparatus 5. Further, the installation place information 27c is registered by an administrator of the image forming apparatus 5 in advance when the image forming apparatus 5 is installed. Such apparatus information 27 has contents that are different according to the function, the storage capacity, and the installation place of each image forming apparatus 5.

When selecting a spool destination candidates based on the plural pieces of apparatus information 27, the print server 3 understands a function that can be performed in each image forming apparatus 5 based on the function information 27a included in the apparatus information 27. The print server 3 compares the setting information included in the print job 8 with the function that can be performed in each image forming apparatus 5 to determine whether each image forming apparatus 5 can do the print job 8. As a result, when the plurality of image forming apparatuses 5 includes the image forming apparatus 5 that cannot execute the print job 8 using the setting defined in the print job 8, the print server 3 excludes such an image forming apparatus 5 from spool destination candidates. That is to say, the print server 3 extracts only the image forming apparatuses 5 that can execute the print job 8 from the plurality of image forming apparatuses 5, and selects the extracted apparatuses as spool destination candidates.

The print server 3 reads the plural pieces of history information 26 from the storage part 32 (step S33). FIG. 8 is a diagram illustrating one example of the history information 26. The history information 26 illustrated in FIG. 8 is information obtained from one image forming apparatus 5 in the plurality of image forming apparatuses 5. As illustrated in FIG. 8, when each image forming apparatus 5 executes the print job 8, information about the user who has executed the print job 8, and the information about the print job 8 are recorded in the history information 26. For example, the history information 26 includes a user name 26a of the user who has executed the print job 8, a job ID 26b of the print job 8, an accumulation date 26c representing a date when the print job 8 is spooled, and an execution date 26d representing the date of executing the print job 8. When user sees the history information 26, the user can understand a number of times the print job 8 is executed in each image forming apparatus 5 and a waiting time until the spooled print job 8 is executed.

The print server 3 calculates a use frequency of each image forming apparatus 5 used by the user who has issued the current print job 8 in the past based on the plural pieces of history information 26 (step S34). FIG. 9 is a diagram illustrating a use frequency of each user. FIG. 9 illustrates use frequencies relating to a plurality of users A to D who have used the respective image forming apparatuses 5a to 5c in the past. However, at step S34, the print server 3 may calculate only the use frequencies relating to the user who has issued the current print job 8.

For example, a total number of times the user A has used the plurality of image forming apparatuses 5a to 5e to execute the print job 8 is 245 times, and in these apparatuses, the use frequency of the image forming apparatus 5a is the highest, namely, 40% of 245 times. When the print server 3 calculates the use frequencies of the user who has issued the print job 8, the print server 3 calculates the use frequencies of the image forming apparatuses 5a to 5e by a percentage with respect to the total number of use times relating to the user. A frequency the user D has used the image forming apparatus 5c is 100%, but since a total number of use times is three, a number of times the print job 8 is executed by the image forming apparatus 5c is only three.

When the print server 3 calculates the use frequencies relating to the user who has issued the current print job 8, the print server 3 determines whether the total number of use times relating to the user is a predetermined number of times or more (step S35). The predetermined number of times is a value preset to, for example, about 30 times. When the total number of the use times relating to the user is the predetermined number of times or more (YES at step S35), the print server 3 can approximately accurately specify the image forming apparatus 5 that is used for executing the print job 8 by the user according to the use frequency. For this reason, when the number of the use times relating to the user is the predetermined number of times or more, the print server 3 decides the image forming apparatus 5 whose use frequency relating to the user calculated at step S34 is the predetermined number of times or more as a spool destination from the plurality of image forming apparatuses 5 selected as spool destination candidates as step S32 (step S36). For example, 30% is preset as the predetermined value, and the print server 3 decides the image forming apparatus 5 whose use frequency is 30% or more as a spool destination of the print job 8. In such a process, the print server 3 decides at least one image forming apparatus 5 as a spool destination of the print job 8.

The print server 3, then, calculates an average waiting time of the print job 8 when the user has executed the print job 8 in the past, namely, an average time until the spooled print job 8 is executed (step S37). That is to say, the print server 3 performs a difference operation on the accumulation dates 26c and the execution dates 26d of the respective print jobs 8 executed by the user in the past to calculate the waiting times of the respective print jobs 8 from the plural pieces of history information 26. The print server 3 averages the calculated waiting times to calculate the average waiting time of the print job 8.

The print server 3 determines whether the average waiting time of the print job 8 calculated at step S37 is shorter than a predetermined time (step S38). The predetermined time is set to, for example, about 3 minutes. When the average waiting time of the print job 8 is shorter than the predetermined time, the user tends to move to the image forming apparatus 5 and instructs printout immediately after the user issues the print job 8. That is to say, the user whose average waiting time of the print job 8 is shorter than the predetermined time desires to immediately get a printed material. When the image forming apparatus 5 that is daily used is busy or cannot be immediately used due to a failure, such a user might use another image forming apparatus 5 to perform printout. In this case, the print server 3 increases a number of the image forming apparatuses 5 to be spool destinations.

For this reason, when the average waiting time of the print job 8 is shorter than the predetermined time (YES at step S38), the print server 3 determines whether a spool destination can be added based on the use frequency relating to the user (step S39). The print server 3 determines whether at least one image forming apparatus 5 remains as a spool destination candidate and the user has used the image forming apparatus 5 that remains as the spool destination candidate in the past. When the user has used the image forming apparatus 5 that remains as the spool destination candidate in the past (YES at step S39), the print server 3 adds at least one image forming apparatus 5 with high use frequency as a spool destination (step S40). As a result, even when the image forming apparatus 5 that is daily used by the user is busy or cannot be immediately used due to a failure, the print job 8 can be spooled in the image forming apparatus 5 that is tried to be used next by the user.

On the contrary, when the user has not used the image forming apparatus 5 that remains as spool destination candidates in the past (NO at step S39), the print server 3 adds, in the image forming apparatuses 5 that remain as spool destination candidates, the image forming apparatus 5 which is installed near the image forming apparatus 5 used the most frequently by the user to the spool destinations based on the installation place information 27c of the apparatus information 27 (step S41). As a result, even when the image forming apparatus 5 that is daily used by the user is busy or cannot be immediately used due to a failure, the print job 8 can be spooled in the image forming apparatus 5 installed near that is tried to be used next by the user.

On the other hand, when the average waiting time of the print job 8 is longer than the predetermined time (NO at step S38), the print server 3 determines whether the two or more image forming apparatuses 5 have been already decided as spool destinations (step S42). As a result, when one image forming apparatus 5 that is decided as a spool destination is present (NO at step S42), the print server 3 executes the process at steps S39 to S41 so as to increase a number of the image forming apparatuses 5 to be spool destinations. Further, when the two or more image forming apparatuses 5 have been already decided as spool destinations (YES at step S42), the process to be executed by the print server 3 goes to step S44.

Further, when the total number of use times relating to the user is less than the predetermined number of times at step S35, it is difficult to accurately obtain use tendency of the user from the use frequency because a number of samples is small. For this reason, when the total number of use times relating to the user is less than the predetermined number of use times (NO at step S35), the print server 3 decides all the image forming apparatuses 5, which are selected as spool destination candidates, as spool destinations (step S43). That is to say, when the total number of use times relating to the user is less than the predetermined number of times, the print server 3 makes the number of the image forming apparatuses 5 to be spool destinations larger than the number of apparatuses 5 when the total number of times is the predetermined number of times or more. As a result, the image forming apparatus 5 where the print job 8 is not spooled is prevented from being used.

The print server 3, then, checks a residual storage capacity of each image forming apparatus 5 decided as the spool destinations (step S44). That is to say, the print server 3 sees the storage capacity information 27b of the apparatus information 27 related to each image forming apparatus 5 decided as a spool destination so as to check the residual storage capacity of each image forming apparatus 5. The print server 3 compares a data capacity of the received print job 8 with the residual storage capacity of each image forming apparatus 5, and determines whether any spool destination whose residual storage capacity is insufficient for storing the print job 8 is present (step S45). As a result, when any image forming apparatus 5 that has insufficient residual storage capacity is present (YES at step S45), the print server 3 transmits the command for transferring the old print job 8 to the image forming apparatus 5 having insufficient residual storage capacity (step S46). When any image forming apparatus 5 having insufficient residual storage capacity is not present (NO at step S45), the process at step S46 is not executed.

Back to the flowchart in FIG. 5, in the print server 3, the job transmitter 44 functions to transmit the print job 8 to each image forming apparatus 5 decided as a spool destination. That is to say, the print server 3 executes a transmission order deciding process first (step S15). In the transmission order deciding process, for example, the two or more image forming apparatuses 5 decided as spool destinations are ranked for the transmission of the print job 8 in decreasing order of the use frequency. That is to say, the print server 3 in this embodiment does not simultaneously transmit the print job 8 to the two or more image forming apparatuses 5 but transmits the print job 8 sequentially to each of the two or more image forming apparatuses 5. As a result, an excessive load is prevented from being put on the network 6. Since the print server 3 ranks the two or more image forming apparatuses 5 to which the print job 8 is transmitted in decreasing order of use frequency relating to the user, the print job 8 is transmitted to the apparatuses 5 in decreasing order of use frequency relating to the user.

When the print server 3 decides the transmission order, the print server 3 selects the image forming apparatuses 5 to be spool destinations one by one sequentially in decreasing order of the transmission (step S16). The print server 3 determines whether the print job 8 provided with a master flag has been already transmitted (step S17), and when the print job 8 provided with master flag has not been transmitted yet (NO, at step S17), the print server 3 adds a master flag to the print job 8 to be transmitted (step S18). The master flag is information to be added only to the print job 8 to be transmitted to one image forming apparatus 5 in the two or more image forming apparatuses 5 decided as spool destinations, and is information for discriminating from the print job 8 to be transmitted to another image forming apparatus 5. That is to say, the print job 8 with the master flag is transmitted only to the one image forming apparatus 5 in the two or more image forming apparatuses 5, and is treated as original job data.

On the other hand, when the print job 8 provided with the master flag has been already transmitted (YES at step S17), the print server 3 adds a replicated flag different from the master flag to the print job 8 to be transmitted (step S19). The replicated flag is information for discrimination from the print job 8 with the master flag and represents that job data is replicated.

Thereafter, the print server 3 transmits the print job 8 with the master flag or the replicated flag to the one image forming apparatus 5 selected at step S16 (step S20). When the transmission of the print job 8 is completed, the print server 3 determines whether another spool destination to which the print job 8 has not been yet transmitted is present (step S21). When such a spool destination is present (YES at step S21), the print server 3 returns to step S16 so as to repeat the above process. Therefore, in this embodiment, the print job 8 with the master flag is transmitted to the image forming apparatus 5 with the highest use frequency relating to the user, and the print job 8 with the replicated flag is transmitted to the other image forming apparatus 5. When the transmission of the print job 8 to all the two or more image forming apparatuses 5 decided as spool destinations is completed (NO at step S21), the process to be executed by the print server 3 returns to step S10. The print server 3 repeats the above process.

Figure 10:
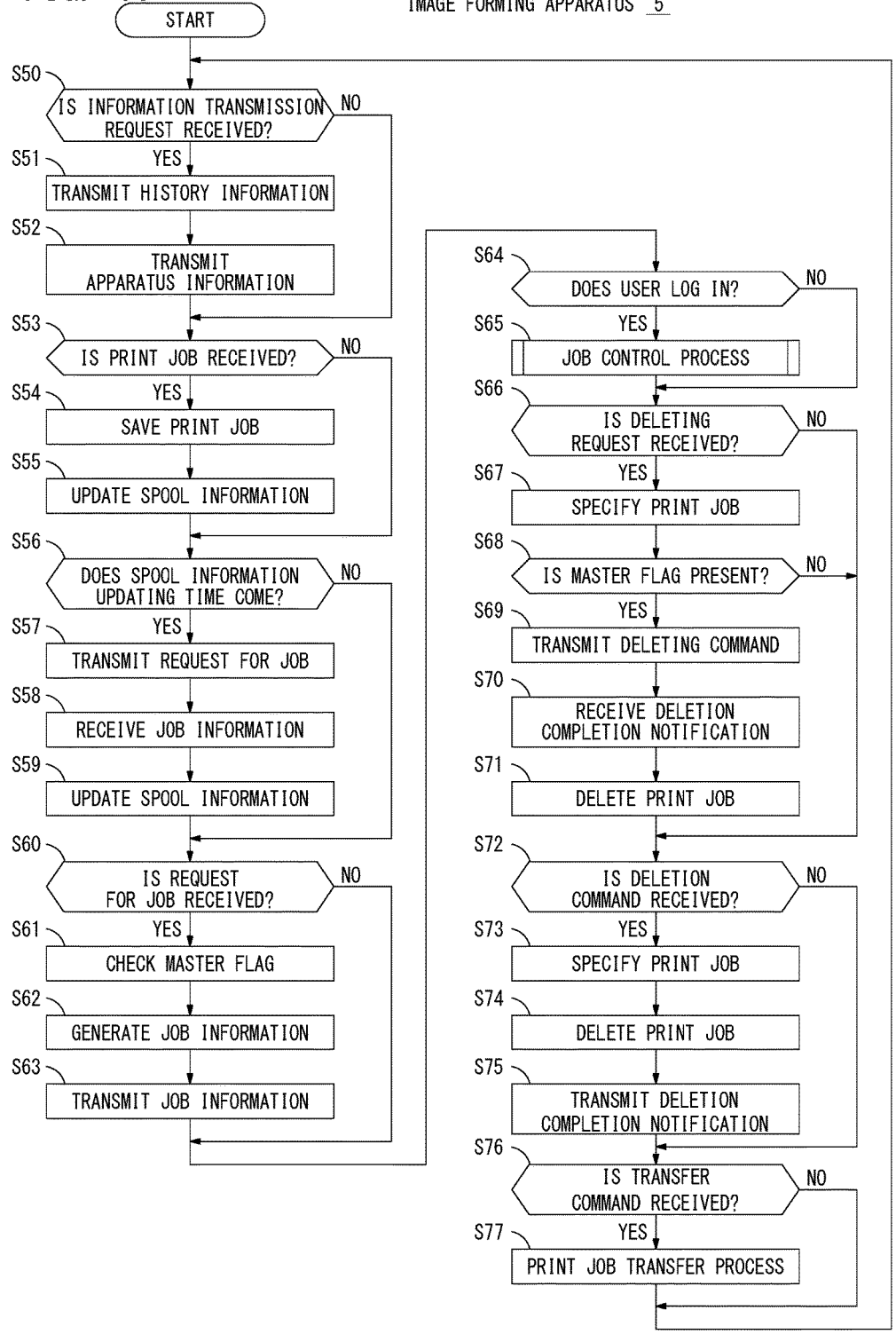
FIG. 10 is a flowchart illustrating one example of a main processing procedure to be executed in the image forming apparatus.

A processing procedure to be executed in each of the plurality of image forming apparatuses 5 is described below. FIG. 10 is a flowchart illustrating one example of the processing procedure to be executed in the image forming apparatus 5. This process is executed in a manner that the CPU of the controller 10 executes a predetermined program. When the image forming apparatus 5 starts this process, the image forming apparatus 5 determines whether the apparatus receives a request for transmitting information from the print server 3 (step S50). As a result, when the image forming apparatus 5 receives the request for transmitting information from the print server 3 (YES at step S50), the image forming apparatus 5 reads the history information 26 from the storage part 16 and transmits the history information 26 to the print server 3 (step S51). The mage forming apparatus 5, then, reads the apparatus information 27 from the storage part 16 and transmits the apparatus information 27 to the print server 3 (step S52). When the image forming apparatus 5 does not receive the request for transmitting information (NO at step S50), the apparatus skips the process at steps S51 and S52.

The image forming apparatus 5 determines whether the apparatus receives the print job 8 from the print server 3 (step S53). When the image forming apparatus 5 receives the print job 8 (YES at step S53), the image forming apparatus 5 stores to save the print job 8 in the job storage region 18 (step S54), and records the information about the print job 8 in the spool information 25 so as to update the spool information 25 (step S55). When the image forming apparatus 5 does not receive the print job 8 (NO at step S53), the apparatus skips the process at steps S54 and S55.

The image forming apparatus 5 determines whether the spool information updating timing comes (step S56). That is to say, the image forming apparatus 5 obtains the information about the print job 8 spooled in the other image forming apparatuses 5 and determines whether the timing for updating the spool information 25 comes. As a result, when the spool information updating timing comes (YES at step S56), the image forming apparatus 5 performs multi-destination transmission on the job request to the other image forming apparatuses 5 (step S57). Thereafter, when the image forming apparatus 5 receives the job information about the print job 8 currently spooled from the other image forming apparatuses 5 (step S58), the image forming apparatus 5 updates the spool information 25 based on the job information (step S59). As a result, the information about all print jobs 8 spooled in the image forming system 1 is recorded in the spool information 25. When the timing for updating the spool information 25 does not come (NO at step S56), the image forming apparatus 5 skips the process at steps S57 to S59.

The image forming apparatus 5, then, determines whether the apparatus receives the job request from the other image forming apparatuses 5 (step S60). When the image forming apparatus 5 receives the job request from the other image forming apparatuses 5 (YES at step S60), the image forming apparatus 5 checks if the master flag is added to the print jobs 8 stored in the job storage region 18 (step S61). The image forming apparatus 5 extracts all the print jobs 8 provided with the master flag, and generates job information about the extracted print jobs 8 (step S62). Thereafter, the image forming apparatus 5 transmits the job information to the image forming apparatus 5 as a job request source (step S63). When the print job 8 is not stored in the job storage region 18 or a replicated flag is added to all the print jobs 8 stored in the job storage region 18, the image forming apparatus 5 does not transmit the job information. That is to say, even when the one print job 8 is spooled in the two or more image forming apparatuses 5, only the image forming apparatus 5 that spools the print job 8 with the master flag responds to the job requests from the other image forming apparatuses 5. As a result, each image forming apparatus 5 can understand in which of the image forming apparatuses 5 the print job 8 with the master flag is spooled. When the image forming apparatus 5 does not receive the job requests from the other image forming apparatuses 5 (NO at step S60), the image forming apparatus 5 skips the process at steps S61 to S63.

When the user is authenticated in the authentication process, the image forming apparatus 5 determines whether the user logs in (step S64). When the user logs in (step S64), the image forming apparatus 5 executes the job control process (step S65).

Figure 11:
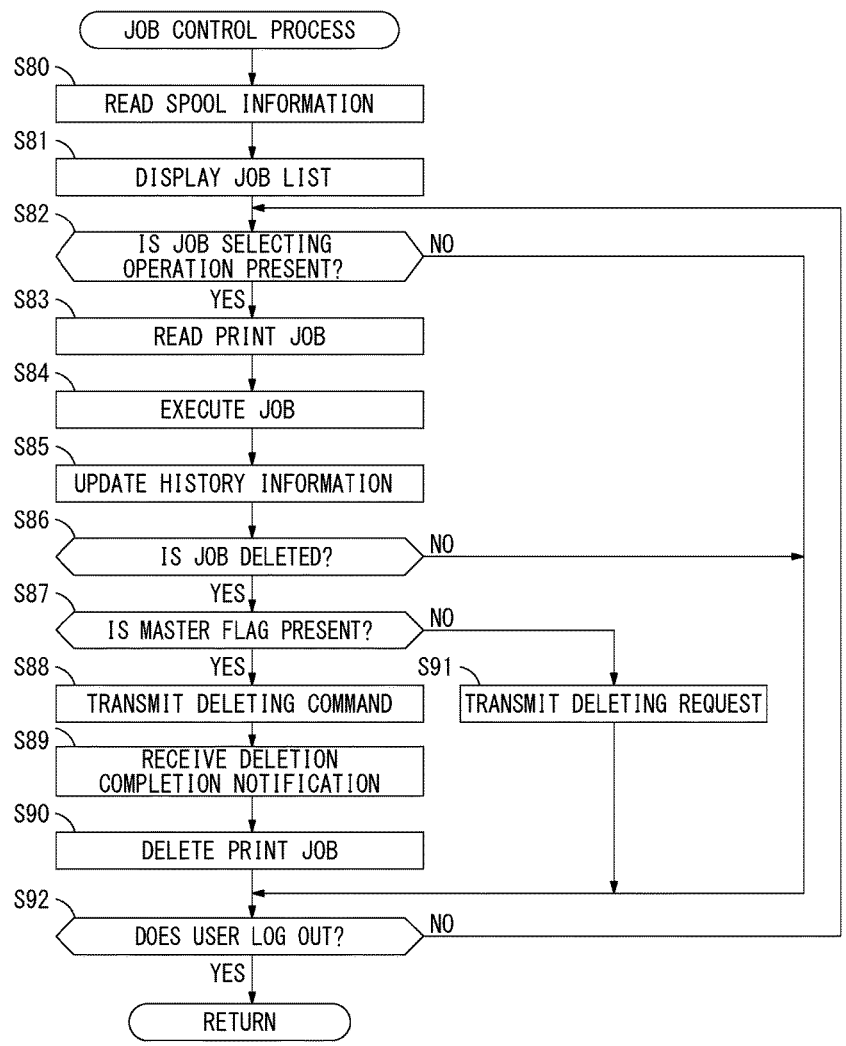
FIG. 11 is a flowchart illustrating one example of a detailed processing procedure of a job control process.

FIG. 11 is a flowchart illustrating one example of a detailed processing procedure of the job control process (step S65). When the job control process starts, the image forming apparatus 5 reads the spool information 25 from the storage part 16 (step S80). The image forming apparatus 5 extracts the information about the print job 8 issued by the log-in user from all pieces of information about the print jobs 8 recorded in the spool information 25. Further, the image forming apparatus 5 creates a job list based on the extracted information, and displays the job list on the display part 12 of the operation panel 11 (step S81). The job list displayed on the display part 12 includes also the information about the print jobs 8 that are not spooled in the image forming apparatus 5 but spooled in the other image forming apparatuses 5. For this reason, the log-in user can select the print job 8 to be printed from the job list and can instruct the execution of the print job 8 without seeing in which of the image forming apparatuses 5 the print job 8 is spooled.

When displaying the job list, the image forming apparatus 5 determines whether the log-in user selects the print job 8 (step S82). When the print job 8 is selected (YES at step S82), the image forming apparatus 5 reads the print job 8 selected by the log-in user (step S83). At this time, when the print job 8 selected by the log-in user is stored in the job storage region 18, the image forming apparatus 5 reads the print job 8 from the job storage region 18. On the contrary, when the print job 8 selected by the log-in user is not stored in the job storage region 18, the image forming apparatus 5 requests the print job 8 from the other image forming apparatuses 5 to obtain the print job 8. In this embodiment, since the same print job 8 is spooled in the two or more image forming apparatuses 5 that are likely to be used by the user, a likelihood that the print job 8 selected by the log-in user is not stored in the job storage region 18 is extremely low. In other words, since the print job 8 selected by the log-in user can be read quickly from the job storage region 18, a time required for obtaining the print job 8 can be shortened. The image forming apparatus 5 executes the print job 8 obtained at step S83 and performs printout (step S84). Thereafter, when the execution of the print job 8 is completed, the image forming apparatus 5 updates the history information 26 (step S85).

The image forming apparatus 5 determines whether the finished print job 8 is deleted (step S86). For example, when the execution of the print job 8 is instructed by the log-in user and the print job 8 is instructed to be deleted as the print job 8 is completed, the image forming apparatus 5 makes the determination as YES at step S86. Further, when the print job 8 is not specified to be deleted as the execution of the print job 8 is completed, the determination is made as NO at step S86.

When deleting the print job 8 (YES at step S86), the image forming apparatus 5 determines whether a master flag is added to the print job 8 (step S87). When the master flag is added (YES at step S87), the image forming apparatus 5 deletes the print jobs 8 with replicated flags spooled in the other image forming apparatuses 5, and deletes the print job 8 with master flag spooled by the self device. That is to say, the image forming apparatus 5 transmits a deleting command, in which the print jobs 8 to be deleted are specified by using job IDs, to the other image forming apparatuses 5 (step S88). According to this deleting command, the other image forming apparatuses 5 delete the print jobs 8 with replicated flags, and returns a notification about completion of the deletion. When receiving the notification about the completion of the deletion from the other image forming apparatuses 5 (step S89), the image forming apparatus 5 deletes the print job 8 with master flag stored in the job storage region 18 (step S90). The image forming apparatus 5 updates the spool information 25 according to the deletion of the print job S.

On the contrary, when a replicated flag is added to the completed print job 8 (NO at step S87), the image forming apparatus 5 transmits a deleting request, in which the print jobs 8 to be deleted is specified by using job IDs, to the other image forming apparatuses 5 that spool the print jobs 8 with master flag (step S91). With this deleting request, the other image forming apparatuses 5 that spool the print jobs 8 with master flag mainly execute a process for deleting the same print jobs 8 spooled in the two or more image forming apparatuses 5.

Thereafter, the image forming apparatus 5 determines whether the user logs out (step S92). When the user does not log out (NO at step S92), the image forming apparatus 5 returns to step S82 and repeats the above process. Further, when the user logs out (YES at step S92), the job control process ends.

Back to FIG. 10, when the user does not log in (NO at step S64), the image forming apparatus 5 skips the job control process (step S65).

The image forming apparatus 5, then, determines whether the deleting request is received from another image forming apparatus 5 (step S66). When receiving the deleting request (YES at step S66), the image forming apparatus 5 specifies the print job 8 to be deleted in the print jobs 8 stored in the job storage region 18 based on a job ID included in the deleting request (step S67), and determines whether a master flag is added to the specified print job 8 (step S68). As a result, when a master flag is added to the specified print job 8 (YES at step S68), the image forming apparatus 5 transmits the deleting command, in which the print job 8 to be deleted is specified by using a job ID, to another image forming apparatus 5 (step S69). With this deleting command, another image forming apparatus 5 deletes the print job 8 with a replicated flag, and returns a notification about completion of the deletion. When receiving the notification about the completion of the deletion from another image forming apparatus 5 (step S70), the image forming apparatus 5 deletes the print job 8 with a master flag stored in the job storage region 18 (step S71). Further, the image forming apparatus 5 updates the spool information 25 according to the deletion of the print job 8. When the master flag is not added to the specified print job 8 (NO at step S68), the image forming apparatus 5 skips the process at steps S69 to S71. When the image forming apparatus 5 does not receive the deleting request from another image forming apparatus 5 (NO at step S66), the image forming apparatus 5 skips the process at steps S67 to S71.

The image forming apparatus 5, then, determines whether the deleting command is received from another image forming apparatus 5 (step S72). When receiving the deleting command (YES at step S72), the image forming apparatus 5 specifies the print job 8 to be deleted in the print jobs 8 stored in the job storage region 18 based on a job ID included in the deleting command (step S73), and deletes the specified print job 8 (step S74). Accordingly, the image forming apparatus 5 updates the spool information 25. The image forming apparatus 5 transmits the notification about completion of the deletion to a transmission source of the deleting command (step S75). When the image forming apparatus 5 does not receive the deleting command from another image forming apparatus 5 (NO at step S72), the image forming apparatus 5 skips the process at steps S73 to S75.

The image forming apparatus 5 determines whether a command for transferring an old print job 8 is received from the print server 3 (step S76). When the image forming apparatus 5 receives the transfer command (YES at step S76), the image forming apparatus 5 transmits the old print job 8 stored in the job storage region 18 to another image forming apparatus 5 based on an instruction from the print server 3 included in the transfer command (step S77). Accordingly, the image forming apparatus 5 deletes the old print job 8 from the job storage region 18 to increase the residual storage capacity and updates the spool information 25. When receiving no transfer command (NO at step S76), the image forming apparatus 5 skips the process at step S77.

In this embodiment, when the print server 3 decides a spool destination of the print job 8 received from the information processing device 2, the print server 3 decides two or more image forming apparatuses 5 in the plurality of image forming apparatuses 5 as spool destinations based on the plural pieces of history information 26 obtained from the plurality of image forming apparatuses 5, respectively. At this time, the print server 3 selects image forming apparatuses 5 that can execute the print job 8 as spool destination candidates from the plurality of image forming apparatuses 5 based on the plural pieces of apparatus information 27 obtained from the plurality of image forming apparatuses 5, respectively. The print server 3, then, decides the two or more image forming apparatuses 5 to be spool destinations preferentially from these spool destination candidates. In such a configuration, after the user introduces the print job 8, when the user moves to any one of the plurality of image forming apparatuses 5 to instruct printout, a likelihood that the print job 8 is not spooled in the image forming apparatus 5 used by the user is extremely low. For this reason, the image forming apparatus 5 used by the user does not have to obtain the print job 8 specified by the user from another image forming apparatus 5, and can immediately start to execute the print job 8.

According to this embodiment, since the time until the print job is started can be made to be shorter than a conventional time, a user waiting time can be shortened.

Second Preferred Embodiment

A second embodiment is described below. The first embodiment has illustrated the case where when the print server 3 transmits the print job 8 to the two or more image forming apparatuses 5 decided as spool destinations, the print server 3 transmits the print job 8 including image data for all pages to any image forming apparatus 5. However, when the print server 3 transmits the print job 8 including image data for all pages whose number is large to all the two or more image forming apparatuses 5 decided as spool destinations, a proportion of an entire storage capacity of the image forming system 1 occupied by one print job 8 becomes large. Therefore, the second embodiment describes an embodiment where a time until execution of a print job 8 is started in an image forming apparatus 5 used by a user is shortened, and simultaneously the proportion of an entire storage capacity of an image forming system 1 occupied by one print job 8 is reduced.

Figure 12:
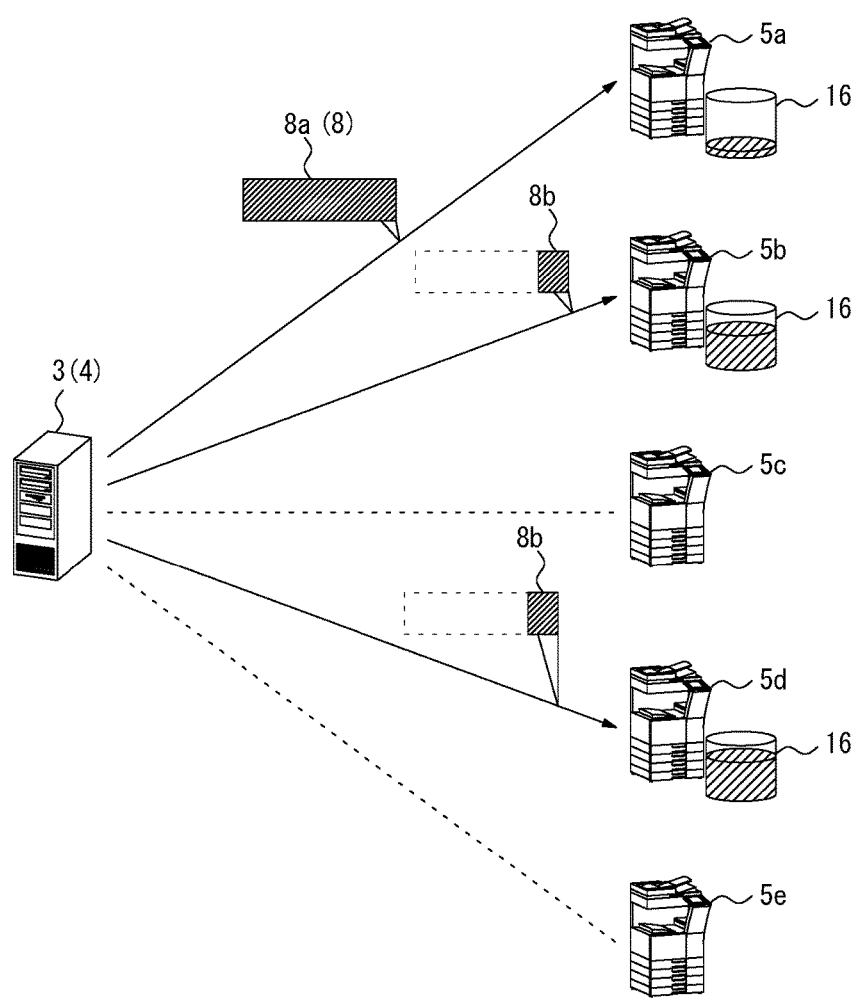
FIG. 12 is a diagram describing a transmission concept of the print job according to a second embodiment.

FIG. 12 is a diagram describing a transmission concept where a print server 3 transmits the print job 8 to a spool destination in the second embodiment. FIG. 12 illustrates a case where the print server 3 decides three image forming apparatuses 5a, 5b, and 5d as spool destinations from a plurality of image forming apparatuses 5a to 5e using a method similar to the method in the first embodiment. When the spool destinations are decided, a job transmitter 44 functions in the print server 3. When the job transmitter 44 in this embodiment, as shown in FIG. 12, transmits the print job 8 to the three image forming apparatuses 5a, 5b, and 5d decided as spool destinations, the job transmitter 44 transmits whole data 8a of the print job 8 to the image forming apparatus 5a in the three image forming apparatuses 5a, 5b, and 5d, and transmits only first partial data 8b of the print job 8 to the other two image forming apparatuses 5b and 5d. The first partial data 8b of the print job 8 is data for first one page or two and three pages when the print job 8 includes, for example, image data for a plurality of pages.

The following two methods exist as a method for deciding one image forming apparatus, to which the job transmitter 44 transmits whole data 8a of the print job 8, in three image forming apparatuses 3a, 3b, and 3c decided as spool destinations.

The first method is for deciding the image forming apparatus 5a whose storage part 16 has a largest residual storage capacity as a subject to which the whole data 8a of the print job 8 is transmitted. That is to say, the job transmitter 44 sees apparatus information 27 of the three image forming apparatuses 3a, 3b, and 3c decided as spool destinations, and specifies the image forming apparatus 5a whose residual storage capacity is the largest in the three image forming apparatuses 3a, 3b, and 3c. The job transmitter 44 transmits the whole data 8a of the print job 8 to the image forming apparatus 5a whose residual storage capacity is the largest, and transmits the first partial data 8b of the print job 8 to the other image forming apparatuses 5b and 5c.

The second method is for deciding the image forming apparatus 5a that is used by the user most frequently as a target for transmission of the whole data 8a of the print job 8. That is to say, the job transmitter 44 sees the use frequencies of the three image forming apparatuses 3a, 3b, and 3c decided as spool destinations, and specifies the image forming apparatus 5a which is used most frequently in the three image forming apparatuses 3a, 3b, and 3c. The job transmitter 44 transmits the whole data 8a of the print job 8 to the image forming apparatus 5a which is used most frequently, and transmits the first partial data 8b of the print job 8 to the other image forming apparatuses 5b and 5c.

Figure 13:
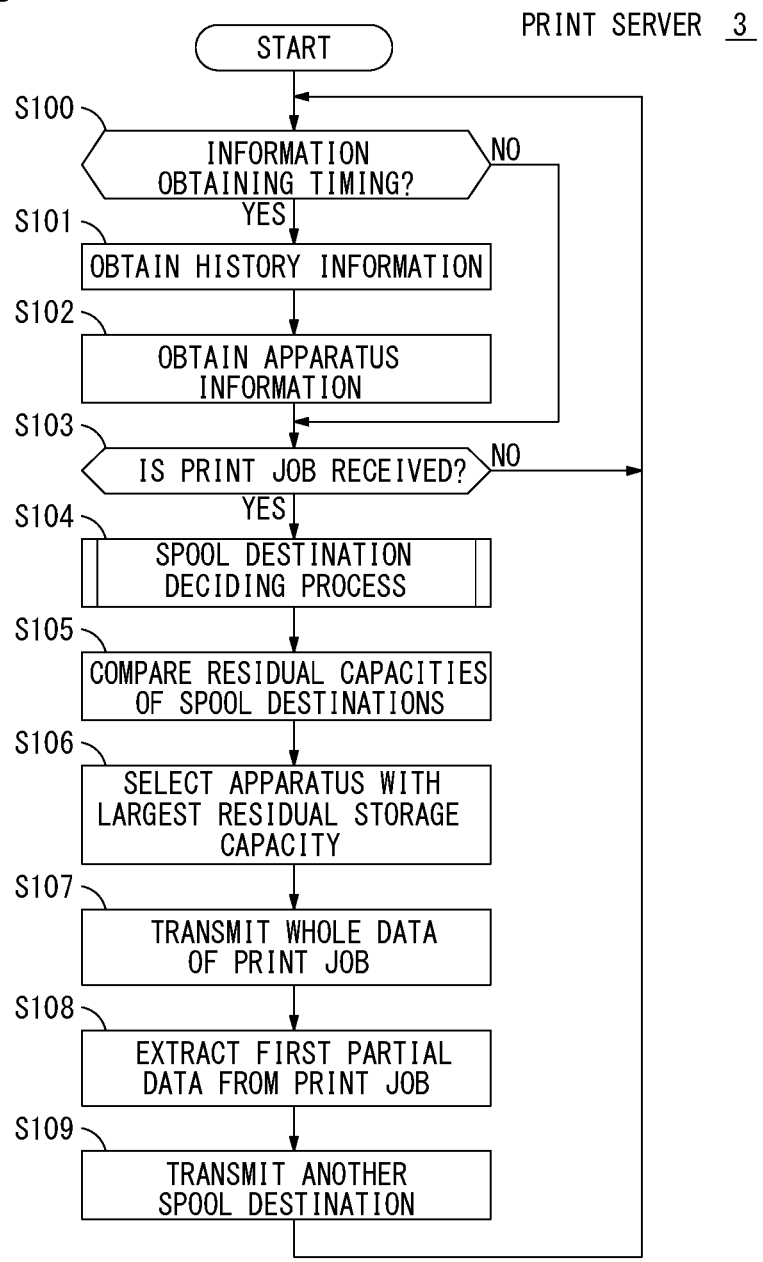
FIG. 13 is a flowchart illustrating one example of a processing procedure of a print server according to the second embodiment.

FIG. 13 is a flowchart illustrating one example of a processing procedure to be executed in the print server 3 when the first method is employed. In the flowchart of FIG. 13, since the process at steps S100 to S104 is similar to the process at steps S10 to S14 illustrated in FIG. 5, detailed description thereof is omitted. When the print server 3 decides the two or more image forming apparatuses 5 as spool destinations of the print job 8 in the spool destination deciding process (step S104), the print server 3 compares residual storage capacities of the two or more image forming apparatuses 5 (step S105). The image forming apparatus 5 selects the image forming apparatus 5 whose residual storage capacity is the largest (step S106), and transmits the whole data 8a of the print job 8 to the selected image forming apparatus 5 (step S107). Further, the image forming apparatus 5 extracts the first partial data 8b of the print job 8 (step S108), and transmits the extracted data 8b to the other image forming apparatuses 5 decided as spool destinations (step S109).

In this embodiment, the two or more image forming apparatuses 5 decided as spool destinations includes an apparatus that stores the whole data 8a of the print job 8 in the job storage region 18, and an apparatus that stores only the first partial data 8b of the print job 8. When a user logs in the image forming apparatus 5 that stores the whole data 8a of the print job 8, the image forming apparatus 5 may read and execute the whole data 8a of the print job 8 stored in the job storage region 18 similarly to the first embodiment.

On the contrary, when the user logs in the image forming apparatus 5 that stores only the first partial data 8b of the print job 8, the image forming apparatus 5 should obtain the residual data of the print job 8 that is not stored in the job storage region 18 from another image forming apparatus 5. For this reason, the image forming apparatus 5 reads the first partial data 8b of the print job 8 stored in the job storage region 18 based on a job executing instruction from the user to start to execute the job, and in parallel, starts to obtain the residual data of the print job 8 from another image forming apparatus 5.

Figure 14:
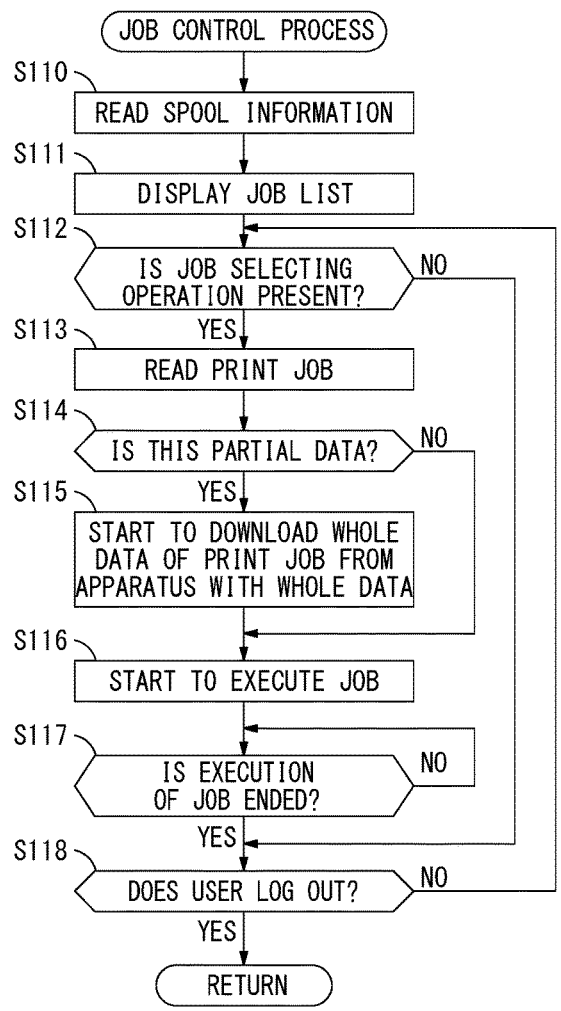
FIG. 14 is a flowchart illustrating one example of a detailed processing procedure of a job control process according to the second embodiment.

FIG. 14 is a flowchart illustrating one example of a detailed processing procedure of a job control process (step S65 in FIG. 10) to be executed in the image forming apparatus 5 according to the second embodiment. In the flowchart of FIG. 14, the process at steps S110 to S113 is similar to the process at steps S80 to S83 illustrated in FIG. 11, and description thereof is omitted. When the image forming apparatus 5 reads the print job 8 from the job storage region 18 based on the instruction from the log-in user, the image forming apparatus 5 determines whether the print job 8 is partial data 8b (step S14). As a result, when the print job 8 is the partial data 8b (YES at step S114), the image forming apparatus 5 starts to download residual data from another image forming apparatus 5 that spools the whole data 8a of the print job 8 (step S115). As the image forming apparatus 5 starts to download the residual data, accordingly starts to execute the print job 8 based on first partial data 8b of the print job 8 (step S116). As a result, while executing the print job 8 based on the first partial data 8b of the print job 8, the image forming apparatus 5 can sequentially obtain succeeding data. For this reason, the image forming apparatus 5 can continue the execution of the job until the printout based on the whole data 8a of the print job 8 is completed.

Further, when the print job 8 read from the job storage region 18 is the whole data 8a (NO at step S114), the image forming apparatus 5 skips the process at step S115, and executes the job based on the whole data 8a of the print job 8.

When the execution of the job is completed (YES at step S117), the image forming apparatus 5 determines whether the user logs out (step S118). When the user does not log out (NO at step S118), the image forming apparatus 5 repeats the process at and after step S112. Further, when the user logs out (YES at step S118), the job control process ends.

In this embodiment, when the print server 3 transmits the print job 8 to the two or more image forming apparatuses 5 decided as spool destinations, the print server 3 transmits the whole data 8a of the print job 8 to one of the two or more image forming apparatuses 5. The print server 3 transmits only the first partial data 8b of the print job 8 to the image forming apparatuses 5 other than that one image forming apparatus 5. When the image forming apparatus 5 has spooled only the first partial data 8b of the print job 8 of which printout is instructed by the user, the image forming apparatus 5 starts to execute the job using the partial data 8b, and obtains residual data in parallel with the execution of the job. For this reason, in this embodiment, in the image forming apparatus 5 to be used by the user, the time until the execution of the print job 8 is started is shortened. Simultaneously, the proportion of the entire storage capacity of the image forming system 1 occupied by one print job 8 can be reduced.

The parts in this embodiment other than the above-described parts are similar to the parts described in the first embodiment.

Third Preferred Embodiment

A third embodiment is described below. This embodiment describes a technique, when a user logs in one image forming apparatus 5 to execute a print job 8 after the user issues the print job 8, can prevent the print job 8 from being improperly executed also in another image forming apparatus 5.

Figure 15:
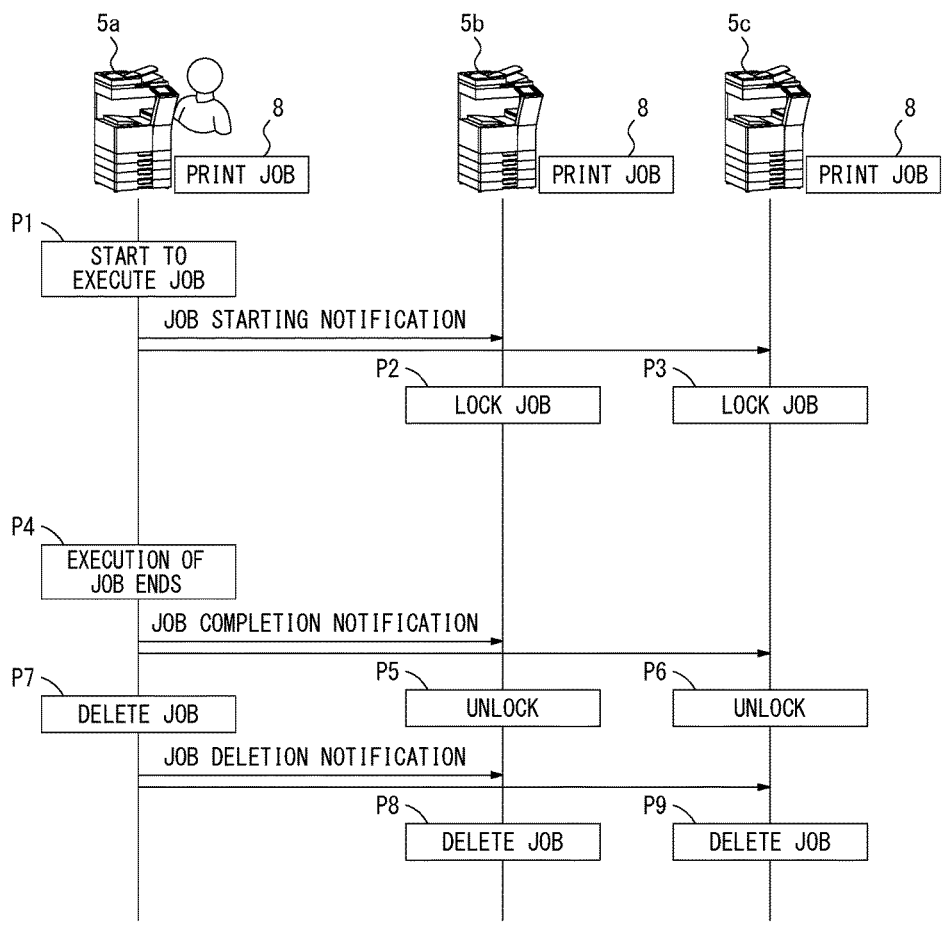
FIG. 15 is a diagram illustrating a concept of an operation of a plurality of image forming apparatuses according to a third embodiment.

FIG. 15 is a diagram illustrating a concept of an operation of a plurality of image forming apparatuses 5a, 5b, and 5c according to the third embodiment. FIG. 15 illustrates a case where a print server 3 decides the three image forming apparatuses 5a, 5b, and 5c as spool destinations, and the print job 8 has been already spooled in the three image forming apparatuses 5a, 5b, and 5c. When the user logs in the image forming apparatus 5a and instructs the execution of the print job 8 in this state, the image forming apparatus 5a starts to execute the print job 8 (process P1). Accordingly, the image forming apparatus 5a transmits a job starting notification to the other image forming apparatuses 5b and 5c. The job starting notification includes information such as a job ID that can specify the print job 8. When the other image forming apparatuses 5b and 5c receive the job starting notification from the image forming apparatus 5a, the other image forming apparatuses 5b and 5c specify the print job 8 that is being executed in the image forming apparatus 5a, and lock the same print job 8 that is spooled in the image forming apparatuses 5b and 5c (processes P2 and P3). As a result, the print job 8 spooled in the other image forming apparatuses 5b and 5c is forbidden from being executed or deleted.

When the print job 8 that is being executed in the image forming apparatus 5a ends (process P4), the image forming apparatus 5a transmits a job completion notification to the other image forming apparatuses 5b and 5c. The job completion notification also includes information such as a job ID that can specify the print job 8. When the other image forming apparatuses 5b and 5c receive the job completion notification from the image forming apparatus 5a, the other image forming apparatuses 5b and 5c specify the print job 8 the execution of which is completed in the image forming apparatus 5a, and unlock the same print job 8 spooled in the image forming apparatuses 5b and 5c (processes P5 and P6). As a result, the print job 8 spooled in the other image forming apparatuses 5b and 5c can be executed or deleted.

Thereafter, the image forming apparatus 58 deletes the print job based on a deleting instruction from the user (process P7). Accordingly, the image forming apparatus 5a transmits a job deleting notification to the other image forming apparatuses 5b and 5c. This job deleting notification also includes information such as a job ID that can specify the print job 8. When receiving the job deleting notification from the image forming apparatus 5a, the other image forming apparatuses 5b and 5c specify the print job 8 to be deleted and delete the same print job 8 spooled in the image forming apparatuses 5b and 5c (processes P8 and P9).

In this embodiment, when the print job 8 are spooled in the two or more image forming apparatuses 5 and the print job 8 is executed in one image forming apparatus 5, the print job 8 spooled in the other image forming apparatuses 5 is locked. For this reason, in the other image forming apparatuses 5, the same print job 8 is prevented from being simultaneously executed or deleted, and, thus, the print job 8 can be protected.

Parts other than the above description in this embodiment are similar to the description in the first and second embodiments.

Fourth Preferred Embodiment

A fourth embodiment is described below. This embodiment describes a form where when after a print server 3 transmits a print job 8 to two or more image forming apparatuses 5 to be spool destinations, a predetermined condition is established by the time when execution of the print job 8 is started, the image forming apparatus 5 to be a spool destination of the print job 8 is changed.

Figure 16:
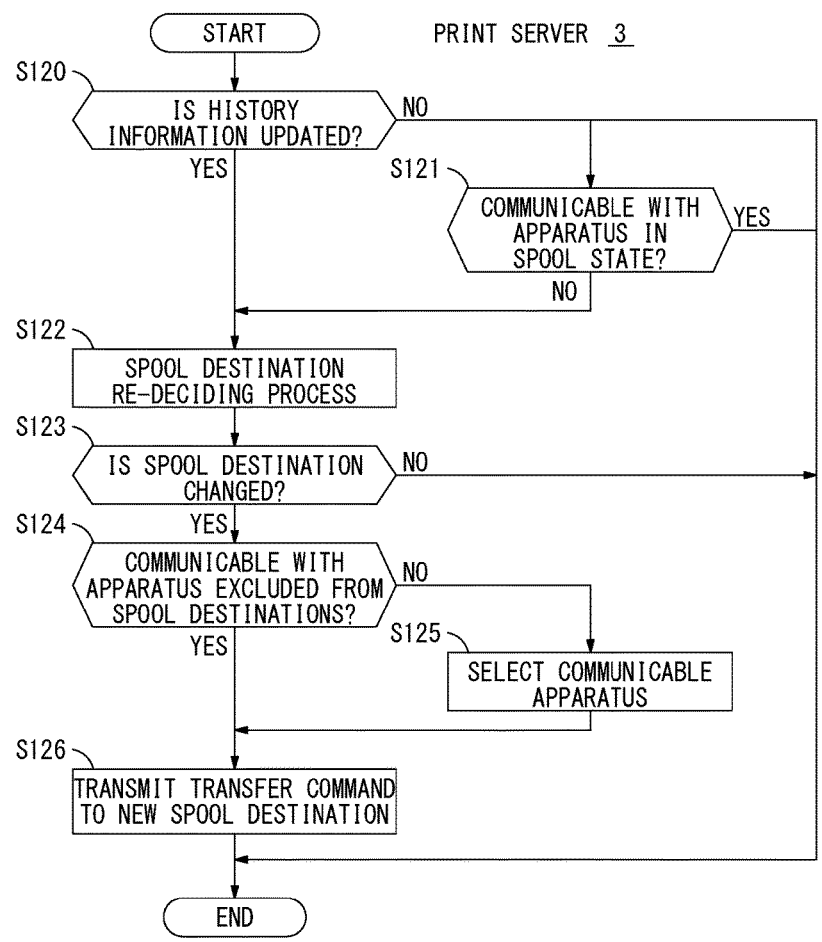
FIG. 16 is a flowchart illustrating one example of a processing procedure of the print server according to a fourth embodiment.

FIG. 16 is a flowchart illustrating one example of a processing procedure to be executed in the print server 3 according to this embodiment. This process is executed by a spool destination deciding part 43 of the print server 3 in parallel with the processing procedure illustrated in FIG. 5, and is repeated, for example, per every constant time. When starting this process, the print server 3 determines whether history information 26 stored in a storage part 32 is updated (step S120). When the plural pieces of history information 26 is not updated (NO at step S120), the print server 3, then, determines whether the print server 3 is communicable with the two or more image forming apparatuses 5 that spool the print job 8 (step S121). As a result, when being communicable (YES at step S121), the print server 3 does not have to change the spool destination, and thus this process ends.

On the other hand, when the history information 26 stored in the storage part 32 is updated, a use frequency relating to a user might be changed from a previous use frequency.

Further, when the print server 3 is not communicable with the image forming apparatus 5 that spools the print job 8, that image forming apparatus 5 cannot be used due to any reason. For this reason, when the history information 26 is updated (YES at step S120) or the print server 3 is not communicable with the image forming apparatus 5 that spools an unexecuted print job 8 (NO at step S121), the print server 3 executes a spool destination re-deciding process (step S122). In the spool destination re-deciding process, the print server 3 calculates the use frequency relating to the user based on latest history information 26, and re-decides the two or more image forming apparatuses 5 as spool destinations based on the user frequency. When an incommunicable image forming apparatus 5 is present, that image forming apparatus 5 is excluded from the spool destinations. In the spool destination re-deciding process, the image forming apparatus 5 that is different from the image forming apparatus 5 that has already spooled the print job 8 is occasionally decided as a spool destination. For this reason, when the spool destination re-deciding process (step S122) ends, the print server 3 determines whether the spool destination is changed (step S123). When the spool destination is not changed (NO at step S123), this process ends.

Further, when the spool destination is changed (YES at step S123), the print server 3 determines whether the print server 3 is communicable with the image forming apparatus 5 excluded from the spool destinations in the image forming apparatuses 5 that have already spooled the print job 8 (step S124). As a result, when the print server 3 is communicable with the image forming apparatus 5 excluded from the spool destinations (YES at step S124), the print server 3 transmits, to the image forming apparatus 5 excluded from the spool destinations, a transfer command for transferring the print job 8 to the image forming apparatus 5 decided as a new spool destination (step S126). According to this transfer command, the image forming apparatus 5 excluded from the spool destinations transmits the print job 8 spooled by the self device to the image forming apparatus 5 decided as a new spool destination, and deletes the print job 8 spooled by the self device. Therefore, when the use frequency relating to the user changes, the print job 8 can be spooled by another image forming apparatus 5 according to the latest use frequency. As a result, the two or more image forming apparatuses 5 that spool the print job 8 can be optimized.

On the other hand, when the print server 3 is not communicable with the image forming apparatus 5 excluded from the spool destinations (NO at step S124), the print server 3 selects one image forming apparatus 5 that spools the print job 8 and is in a communicable state (step S125). The print server 3 transmits the transfer command for transferring the print job 8 to the image forming apparatus 5 decided as the new spool destination to the selected image forming apparatus 5 (step S126). The image forming apparatus 5 that has received the transfer command transmits the print job 8 spooled by the self device to the image forming apparatus 5 decided as the new spool destination. In this case, however, the image forming apparatus 5 that has received the transfer command does not delete but holds the print job 8 spooled by the self device. As a result, even when the image forming apparatus 5 that spools the print job 8 cannot execute the print job 8 due to any reason, the print job 8 is immediately spooled in another image forming apparatus 5, and the state that the print job 8 is spooled in the two or more image forming apparatuses 5 continues.

Parts in this embodiment other than the above description are similar to the description in the first to third embodiments.

(Modifications)

The above have described the embodiments of the present invention, but the present invention is not limited to the contents described in the above embodiments, and various modified example can be applied to the present invention.

In the above embodiments, for example, the print server 3 functions as the print control device 4 to execute the process for deciding the two or more image forming apparatuses 5 as spool destinations, and the process for transmitting the print job 8 to a spool destination. However, the function as the print control device 4 is not always realized by the print server 3.

Figure 17:
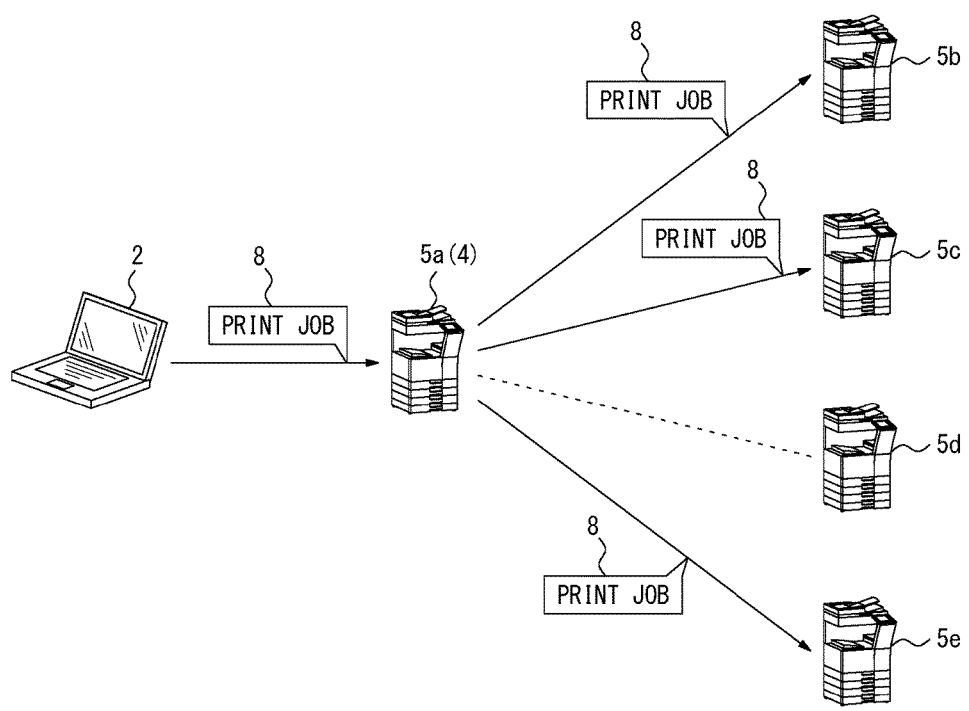
FIG. 17 is a diagram illustrating an example where one image forming apparatus in the plurality of image forming apparatuses functions as a print control device.

FIG. 17 is a diagram illustrating a case where one image forming apparatus 5*a* in the plurality of image forming apparatuses 5*a* to 5*c* functions as the print control device 4. In the example illustrated in FIG. 17, the image forming apparatus 5*a* operates as the print server 3, namely, the print control device 4. That is to say, the image forming apparatus 5*a* collects the history information 26 and the apparatus information 27 of the plurality of image forming apparatuses 5*a* to 5*c*. When receiving the print job 8 from the information processing device 2, the image forming apparatus 5*a* decides the two or more image forming apparatuses 5 as spool destinations based on the history information 26 and the apparatus information 27 of the image forming apparatuses 5*a* to 5*c*, and transmits the print job to the two or more image forming apparatuses 5. The image forming apparatus 5*a* occasionally decides itself as a spool destination. When the one image forming apparatus 5*a* in the plurality of image forming apparatuses 5*a* to 5*e* is allowed to function as the print control device 4, the print server 3 does not have to be installed.

Figure 18:
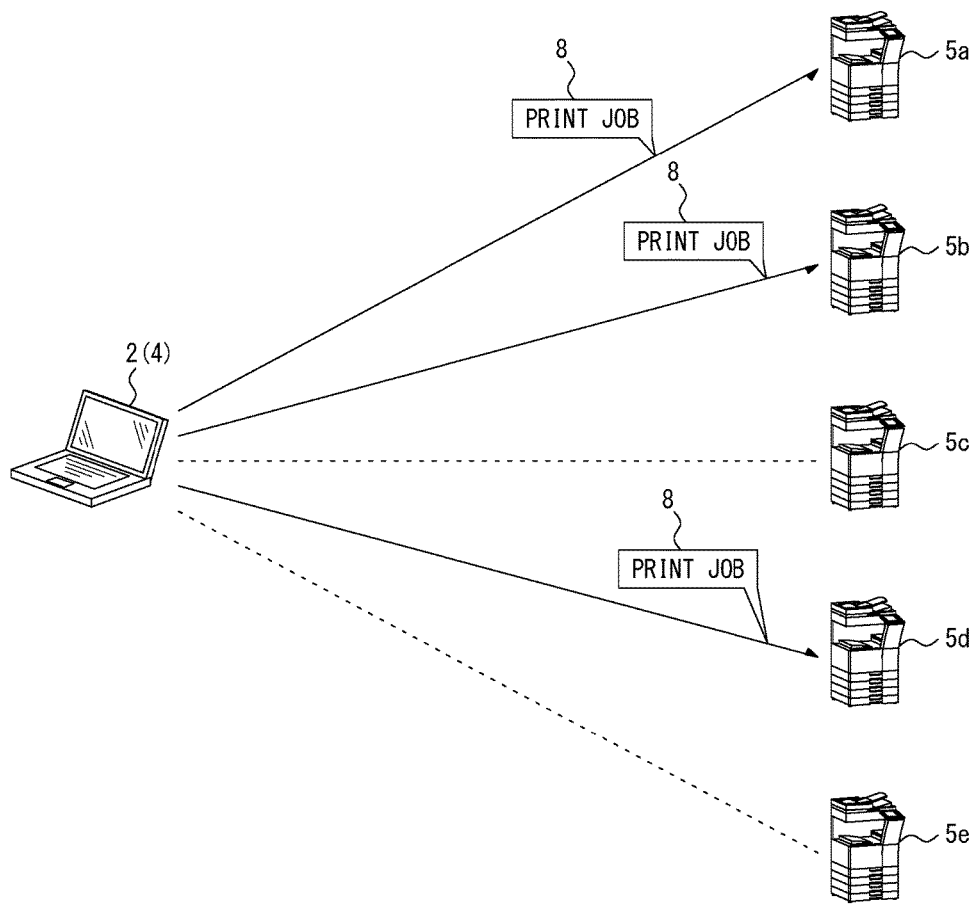
FIG. 18 is a diagram illustrating an example where an information processing device functions as the print control device.

FIG. 18 is a diagram illustrating a case where the information processing device 2 that issues the print job 8 functions as the print control device 4. In the example illustrated in FIG. 18, a print driver is activated in the information processing device 2 to allow the information processing device 2 to function as the print control device 4. That is to say, when the information processing device 2 activates the print driver, the information processing device 2 collects the history information 26 and the apparatus information 27 of the plurality of image forming apparatuses 5*a* to 5*c*. When generating the print job 8 based on an instruction from a user, the information processing device 2 decides the two or more image forming apparatuses 5 as spool destinations based on the history information 26 and the apparatus information 27 of the image forming apparatuses 5*a* to 5*c* so as to transmit the print job 8 to the two or more image forming apparatuses 5. Also when the information processing device 2 is allowed to function as the print control device 4, the print server 3 does not have to be installed.

Although the present invention has been described and illustrated in detail, it is clearly understood that the same is by way of illustrated and example only and is not to be taken by way limitation, the scope of the present invention being interpreted by terms of the appended claims.

What is claimed is:

1. A control device that is an image forming apparatus communicable with a plurality of image forming apparatuses, said control device comprising:
   a storage that stores a job; and
   a hardware processor configured to:
   obtain history information from said plurality of image forming apparatuses;
   decide two or more image forming apparatuses as spool destinations of an accepted job from said plurality of image forming apparatuses based on plural pieces of history information obtained by said hardware processor;

transmit an entirety of the accepted job to each of the two or more image forming apparatuses decided by said hardware processor;

manage the job stored in said storage and the job spooled in another image forming apparatus; and obtain the job from said storage or said another image forming apparatus so as to execute the job, wherein when said hardware processor starts execution of the job obtained from said storage, said hardware processor transmits a job start notification to said another image forming apparatus, and when the execution of the job is completed, said hardware processor transmits a job completion notification to said another image forming apparatus, when said hardware processor receives the job start notification from said another image forming apparatus and a same job as the job executed by said another image forming apparatus is stored in said storage, said hardware processor locks the job, and after receiving the job completion notification from said another image forming apparatus, said hardware processor deletes the job from said storage.

2. The control device according to claim 1, wherein said hardware processor decides the two or more image forming apparatuses in said plurality of image forming apparatuses as spool destinations in decreasing order of use frequency relating to a user based on said plural pieces of history information.

3. The control device according to claim 1, wherein said hardware processor calculates a job waiting time based on said plural pieces of history information, and when the waiting time is shorter than a predetermined time, said hardware processor increases a number of image forming apparatuses to be spool destinations.

4. The control device according to claim 1, wherein when a history of execution by a user who introduces a job does not indicate a predetermined number of times in said plural pieces of history information, said hardware processor increases a number of image forming apparatuses to be spool destinations.

5. The control device according to claim 1, wherein
said hardware processor obtains apparatus information about each image forming apparatus from said plurality of image forming apparatuses,
said hardware processor decides two or more image forming apparatuses from said plurality of image forming apparatuses based on plural pieces of apparatus information obtained by said hardware processor.

6. The control device according to claim 5, wherein said hardware processor selects image forming apparatuses that can execute the job from said plurality of image forming apparatuses as spool destination candidates based on said plural pieces of apparatus information, and decides spool destinations preferentially from said spool destination candidates based on said plural pieces of history information.

7. The control device according to claim 5, wherein said hardware processor decides an image forming apparatus used most frequently by a user as a spool destination based on said plural pieces of history information, and decides an image forming apparatus installed near the image forming apparatus used most frequently by the user as another spool destination based on said plural pieces of apparatus information.

8. The control device according to claim 1, wherein when residual storage capacity is insufficient in the image forming apparatus decided as a spool destination, said hardware processor transfers an old job spooled in the image forming apparatus to another image forming apparatus.

9. The control device according to claim 1, wherein when transmitting a job to the two or more image forming apparatuses decided by said hardware processor, said hardware processor transmits the job to the image forming apparatuses in decreasing order of use frequency relating to a user.

10. The control device according to claim 1, wherein said hardware processor transmits whole data of a job to one of the two or more image forming apparatuses decided by said hardware processor, and transmits only first partial data of the job to another image forming apparatus.

11. The control device according to claim 1, wherein when transmitting a job to the two or more image forming apparatuses decided by said hardware processor, said hardware processor adds a master flag to the job to be transmitted to one image forming apparatus, and adds a replicated flag to the job to be transmitted to another image forming apparatus different from said one image forming apparatus so as to transmit the jobs.

12. A control device that is an image forming apparatus communicable with a plurality of image forming apparatuses, said control device comprising:
a storage that stores a job; and
a hardware processor configured to:
obtain history information from said plurality of image forming apparatuses;
decide two or more image forming apparatuses as spool destinations of an accepted job from said plurality of image forming apparatuses based on plural pieces of history information obtained by said hardware processor;
transmit an entirety of the accepted job to each of the two or more image forming apparatuses decided by said hardware processor; and
manage the jobs stored in said storage and the job spooled in another image forming apparatus,
wherein when the job with a master flag is stored in said storage and the job is deleted, said hardware processor transmits a job deleting command to another image forming apparatus that spools the job with a replicated flag and after receiving a deletion completion notification from another image forming apparatus, said hardware processor deletes said job with the master flag stored in the storage.

13. The control device according to claim 12, wherein said hardware processor decides the two or more image forming apparatuses in said plurality of image forming apparatuses as spool destinations in decreasing order of use frequency relating to a user based on said plural pieces of history information.

14. The control device according to claim 12, wherein said hardware processor calculates a job waiting time based on said plural pieces of history information, and when the waiting time is shorter than a predetermined time, said hardware processor increases a number of image forming apparatuses to be spool destinations.

15. The control device according to claim 12, wherein when a history of execution by a user who introduces a job does not indicate a predetermined number of times in said plural pieces of history information, said hardware processor increases a number of image forming apparatuses to be spool destinations.

16. The control device according to claim 12, wherein
said hardware processor obtains apparatus information about each image forming apparatus from said plurality of image forming apparatuses,
said hardware processor decides two or more image forming apparatuses from said plurality of image forming apparatuses based on plural pieces of apparatus information obtained by said hardware processor.

17. The control device according to claim 16, wherein said hardware processor selects image forming apparatuses that can execute the job from said plurality of image forming apparatuses as spool destination candidates based on said plural pieces of apparatus information, and decides spool destinations preferentially from said spool destination candidates based on said plural pieces of history information.

18. The control device according to claim 16, wherein said hardware processor decides an image forming apparatus used most frequently by a user as a spool destination based on said plural pieces of history information, and decides an image forming apparatus installed near the image forming apparatus used most frequently by the user as another spool destination based on said plural pieces of apparatus information.

19. The control device according to claim 12, wherein when residual storage capacity is insufficient in the image forming apparatus decided as a spool destination, said hardware processor transfers an old job spooled in the image forming apparatus to another image forming apparatus.

20. The control device according to claim 12, wherein when transmitting a job to the two or more image forming apparatuses decided by said hardware processor, said hardware processor transmits the job to the image forming apparatuses in decreasing order of use frequency relating to a user.

21. The control device according to claim 12, wherein said hardware processor transmits whole data of a job to one of the two or more image forming apparatuses decided by said hardware processor, and transmits only first partial data of the job to another image forming apparatus.

22. The control device according to claim 12, wherein when transmitting a job to the two or more image forming apparatuses decided by said hardware processor, said hardware processor adds a master flag to the job to be transmitted to one image forming apparatus, and adds a replicated flag to the job to be transmitted to another image forming apparatus different from said one image forming apparatus so as to transmit the jobs.

23. A non-transitory recording medium in which a computer-readable program to be executed in a computer communicable with a plurality of image forming apparatuses is recorded, wherein said computer is packaged into an image forming apparatus, said program allowing said computer to execute:
 a first step of obtaining history information from said plurality of image forming apparatuses, respectively;
 a second step of deciding two or more of said plurality of image forming apparatuses as job spool destinations of an accepted job based on the plural pieces of history information obtained at said first step;
 a third step of transmitting the job to the two or more image forming apparatuses decided at said second step;
 a fourth step of storing a job in a predetermined storage;
 a fifth step of managing the job stored in said storage and the job spooled in another image forming apparatus; and
 a sixth step of obtaining the job from said storage or another image forming apparatus so as to execute the job, wherein
 at said sixth step, when execution of the job obtained from the storage is started, a job starting notification is transmitted to another image forming apparatus, and when the execution of the job is completed, a job completion notification is transmitted to another image forming apparatus,
 at said fifth step, when the job starting notification is received from another image forming apparatus and a same job as the job executed by said another image forming apparatus is stored in said storage, the job is locked, and after receiving the job completion notification is received from said another image forming apparatus, the job is deleted from said storage.

24. The recording medium according to claim 23, wherein at said second step, the two or more image forming apparatuses in said plurality of image forming apparatuses are decided as spool destinations in decreasing order of user frequency relating to a user based on said plural pieces of history information.

25. The recording medium according to claim 23, wherein at said second step, a job waiting time is calculated based on said plural pieces of history information, and when the waiting time is shorter than a predetermined time, a number of image forming apparatuses to be spool destinations is increased.

26. The recording medium according to claim 23, wherein at said second step, when an execution history by a user who introduces a job does not indicate a predetermined number of times in said plural pieces of history information, a number of image forming apparatuses to be spool destinations is increased.

27. The recording medium according to claim 23, wherein
 at said first step, apparatus information about the image forming apparatuses is obtained from said plurality of image forming apparatuses, respectively, and
 at said second step, two or more of said plurality of image forming apparatuses are decided based on said plural pieces of apparatus information obtained at said first step.

28. The recording medium according to claim 27, wherein at said second step, image forming apparatuses that can execute a job are selected as spool destination candidates from said plurality of image forming apparatuses based on said plural pieces of apparatus information, and spool destinations are decided preferentially from said spool destination candidates based on said plural pieces of history information.

29. The recording medium according to claim 27, wherein at said second step, an image forming apparatus used most frequently by a user is decided as a spool destination based on said plural pieces of history information, and an image forming apparatus installed near the image forming apparatus used most frequently by the user is decided as another spool destination based on said plural pieces of apparatus information.

30. The recording medium according to claim 23, wherein at said second step, when a residual storage capacity is insufficient in the image forming apparatus decided as the spool destinations, an old job spooled in the image forming apparatus is transferred to another image forming apparatus.

31. The recording medium according to claim 23, wherein at said third step, when the job is transmitted to the two or more image forming apparatuses decided at said second step, the job is transmitted to the two or more image forming apparatuses in decreasing order of use frequency relating to a user.

32. The recording medium according to claim 23, wherein at said third step, whole data of the job is transmitted to one of the two or more image forming apparatuses decided at said second step, and only first partial data of the job is transmitted to said another image forming apparatus.

33. The recording medium according to claim 23, wherein at said third step, when transmitting the job to the two or more image forming apparatuses decided at said second step, a master flag is added to the job to be transmitted to one image forming apparatus, and a replicated flag is added to the job to be transmitted to another image forming apparatus different from said one image forming apparatus so that the job is transmitted.

34. A non-transitory recording medium in which a computer-readable program to be executed in a computer communicable with a plurality of image forming apparatuses is recorded, wherein said computer is packaged into an image forming apparatus, said program allowing said computer to execute:
    a first step of obtaining history information from said plurality of image forming apparatuses, respectively;
    a second step of deciding two or more of said plurality of image forming apparatuses as job spool destinations of an accepted job based on the plural pieces of history information obtained at said first step;
    a third step of transmitting the job to the two or more image forming apparatuses decided at said second step;
    a fourth step of storing a job in a predetermined storage; and
    a fifth step of managing the job stored in said storage and the job spooled in another image forming apparatus,
    wherein at said fifth step, when the job with a master flag is stored in said storage and the job is deleted, a job deleting command is transmitted to another image forming apparatus that spools the job with a replicated flag and after a deletion completion notification is received from another image forming apparatus, the job with the master flag stored in said storage is deleted.

35. The recording medium according to claim 34, wherein at said second step, the two or more image forming apparatuses in said plurality of image forming apparatuses are decided as spool destinations in decreasing order of user frequency relating to a user based on said plural pieces of history information.

36. The recording medium according to claim 34, wherein at said second step, a job waiting time is calculated based on said plural pieces of history information, and when the waiting time is shorter than a predetermined time, a number of image forming apparatuses to be spool destinations is increased.

37. The recording medium according to claim 34, wherein at said second step, when an execution history by a user who introduces a job does not indicate a predetermined number of times in said plural pieces of history information, a number of image forming apparatuses to be spool destinations is increased.

38. The recording medium according to claim 34, wherein
    at said first step, apparatus information about the image forming apparatuses is obtained from said plurality of image forming apparatuses, respectively, and
    at said second step, two or more of said plurality of image forming apparatuses are decided based on said plural pieces of apparatus information obtained at said first step.

39. The recording medium according to claim 38, wherein at said second step, image forming apparatuses that can execute a job are selected as spool destination candidates from said plurality of image forming apparatuses based on said plural pieces of apparatus information, and spool destinations are decided preferentially from said spool destination candidates based on said plural pieces of history information.

40. The recording medium according to claim 38, wherein at said second step, an image forming apparatus used most frequently by a user is decided as a spool destination based on said plural pieces of history information, and an image forming apparatus installed near the image forming apparatus used most frequently by the user is decided as another spool destination based on said plural pieces of apparatus information.

41. The recording medium according to claim 34, wherein at said second step, when a residual storage capacity is insufficient in the image forming apparatus decided as the spool destinations, an old job spooled in the image forming apparatus is transferred to another image forming apparatus.

42. The recording medium according to claim 34, wherein at said third step, when the job is transmitted to the two or more image forming apparatuses decided at said second step, the job is transmitted to the two or more image forming apparatuses in decreasing order of use frequency relating to a user.

43. The recording medium according to claim 34, wherein at said third step, whole data of the job is transmitted to one of the two or more image forming apparatuses decided at said second step, and only first partial data of the job is transmitted to said another image forming apparatus.

44. The recording medium according to claim 34, wherein at said third step, when transmitting the job to the two or more image forming apparatuses decided at said second step, a master flag is added to the job to be transmitted to one image forming apparatus, and a replicated flag is added to the job to be transmitted to another image forming apparatus different from said one image forming apparatus so that the job is transmitted.

\* \* \* \* \*